(12) United States Patent
Basulto et al.

(10) Patent No.: US 11,082,587 B2
(45) Date of Patent: Aug. 3, 2021

(54) APPARATUS FOR DIFFERENT SIZED MOBILE DEVICES THAT PERFORM IMAGE CAPTURE

(71) Applicant: iOgrapher, LLC, San Gabriel, CA (US)

(72) Inventors: David Basulto, San Gabriel, CA (US); Jason Ivey, Irvine, CA (US)

(73) Assignee: iOgrapher, LiiC, San Gabriel, CA (US)

( * ) Notice: Subject to any disclaimer, the term of this patent is extended or adjusted under 35 U.S.C. 154(b) by 558 days.

(21) Appl. No.: 15/782,778

(22) Filed: Oct. 12, 2017

(65) Prior Publication Data
US 2018/0035035 A1    Feb. 1, 2018

Related U.S. Application Data

(63) Continuation-in-part of application No. 15/087,297, filed on Mar. 31, 2016, now abandoned, which is a
(Continued)

(51) Int. Cl.
*H04N 5/225* (2006.01)
*H04N 5/232* (2006.01)
(Continued)

(52) U.S. Cl.
CPC ......... *H04N 5/2252* (2013.01); *F16M 11/041* (2013.01); *F16M 13/022* (2013.01);
(Continued)

(58) Field of Classification Search
CPC ...... F16M 13/00; F16M 13/04; F16M 11/041; A45F 2200/0525; A45F 2200/0516;
(Continued)

(56) References Cited

U.S. PATENT DOCUMENTS 8,985,333 B1 * 3/2015 Clementi ............... F16M 13/00
  206/476
9,107,488 B1 * 8/2015 Cordes ................. F16M 11/041
(Continued)

OTHER PUBLICATIONS https://www.amazon.com/dp/B01N0BGUY8/ref=psdc_196573011_t1_B071WRHCPP#customerReviews Listed First on Amazon Oct. 11, 2016 (Year: 2016).*
(Continued)

*Primary Examiner* — John Villecco
(74) *Attorney, Agent, or Firm* — Patent Ingenuity, P.C.; Samuel K. Simpson

(57) ABSTRACT

An apparatus is provided. The apparatus has a first member, a second member, and a third member. The third member couples the first member and the second member such that the second member is parallel to the first member, the third member is perpendicular to the first member and the second member, and the third member is in between the first member and the second member. Further, the apparatus has at least one slot integrated within a rear portion of the third member. In addition, the apparatus has an adjustable member positioned on a front portion of the third member that adheres a mobile computing device to the front portion of the third member. The adjustable member is adjusted within the at least one slot.

18 Claims, 32 Drawing Sheets

Related U.S. Application Data continuation-in-part of application No. 13/895,349, filed on May 15, 2013, now Pat. No. 9,386,194.

(60) Provisional application No. 61/768,751, filed on Feb. 25, 2013.

(51) Int. Cl.
  *H04B 1/3888* (2015.01)
  *H04M 1/04* (2006.01)
  *F16M 13/02* (2006.01)
  *F16M 11/04* (2006.01)
  *G06F 1/16* (2006.01)

(52) U.S. Cl.
  CPC ......... *G06F 1/1656* (2013.01); *H04B 1/3888* (2013.01); *H04M 1/04* (2013.01); *H04N 5/2251* (2013.01); *H04N 5/2328* (2013.01); *A45F 2200/0516* (2013.01); *A45F 2200/0525* (2013.01)

(58) Field of Classification Search
  CPC ..... A45F 2200/0533; A45F 5/00; H04B 1/03; H04B 1/08; H04B 1/086; H04B 1/3877; G03B 17/563; H04M 1/06; H04M 1/11; H04M 1/12; H04M 1/13; H04M 1/14
  See application file for complete search history.

(56) References Cited

U.S. PATENT DOCUMENTS

| | | | | |
|---|---|---|---|---|
| 9,420,712 | B2* | 8/2016 | Yang | F16M 11/38 |
| 9,470,356 | B1* | 10/2016 | Zaloom | A47B 23/04 |
| 9,578,979 | B1* | 2/2017 | Zeuch | G09F 3/12 |
| 9,797,592 | B2* | 10/2017 | Marcus | H05K 5/0086 |
| 10,126,635 | B2* | 11/2018 | Hale | F16M 13/022 |
| 10,128,887 | B2* | 11/2018 | Balmer | F16M 11/242 |
| 10,208,777 | B1* | 2/2019 | Brassard | F16M 11/041 |
| 10,637,980 | B1* | 4/2020 | Nawas | B60R 11/02 |
| 2008/0192410 | A1* | 8/2008 | Kumar | H04M 1/72409 361/679.4 |
| 2012/0257345 | A1* | 10/2012 | Hulet | G06F 1/166 361/679.32 |
| 2012/0257346 | A1* | 10/2012 | Hulet | G06F 1/166 361/679.32 |
| 2013/0043369 | A1* | 2/2013 | Wheeler | A47F 7/024 248/551 |
| 2013/0277520 | A1* | 10/2013 | Funk | G06F 1/1626 248/274.1 |
| 2014/0263931 | A1* | 9/2014 | Chen | F16M 13/00 248/576 |
| 2014/0285968 | A1* | 9/2014 | Budge | F16M 11/041 361/679.56 |
| 2014/0291465 | A1* | 10/2014 | Mendoza | F16M 13/02 248/346.06 |
| 2014/0367535 | A1* | 12/2014 | Rost | F16M 13/00 248/122.1 |
| 2015/0029604 | A1* | 1/2015 | Chalenko | G03B 17/566 359/813 |
| 2015/0157103 | A1* | 6/2015 | Simon | G06F 1/1632 224/191 |
| 2016/0277660 | A1* | 9/2016 | Kaiser | G03B 15/06 |
| 2016/0305646 | A1* | 10/2016 | Marcus | F21V 21/06 |
| 2017/0188724 | A1* | 7/2017 | Lin | F16M 11/041 |
| 2017/0305354 | A1* | 10/2017 | Kang | B60R 11/02 |
| 2017/0347176 | A1* | 11/2017 | Wang | F16M 13/04 |
| 2018/0224725 | A1* | 8/2018 | Jeong | F16M 11/38 |
| 2019/0328127 | A1* | 10/2019 | Jia | F16M 11/36 |
| 2020/0141159 | A1* | 5/2020 | Berglund | E05B 65/00 |
| 2020/0378545 | A1* | 12/2020 | Huang | G06F 1/1656 |

OTHER PUBLICATIONS

"Video Handle Rig"; Ulanzi <http://ulanzi.com:80/URig>; archived at Wayback Machine (https://archive.org)) <http://web.archive.org/web/20170919210348/http://ulanzi.com:80/URig> ; citing a capture dated Sep. 19, 2017 (Year: 2017).*

* cited by examiner

APPARATUS FOR DIFFERENT SIZED MOBILE DEVICES THAT PERFORM IMAGE CAPTURE

RELATED APPLICATIONS

This patent application is a Continuation-In-Part application of U.S. patent application Ser. No. 15/087,297, filed on Mar. 31, 2016, entitled APPARATUS FOR DIFFERENT SIZED MOBLE DEVICES THAT PERFORM IMAGE CAPTURE, which claims priority to U.S. patent application Ser. No. 13/895,349, filed on May 15, 2013, entitled RECEPTACLE FOR AN IMAGE CAPTURE COMPUTING DEVICE, and patented on Jul. 5, 2016 as U.S. Pat. No. 9,386,194, which claims priority to U.S. Provisional Patent Application Ser. No. 61/768,751, filed on Feb. 25, 2013, entitled A PLASTIC CASE FOR THE IPAD MINI AND IPAD. IT HAS HANDLES ON THE SIDES, 3 ACCESSORY SHOE AREAS, A TRIPOD MOUNT, AND THE ABILITY TO SCREW ON 37 MM LENSES, which are hereby incorporated by reference in their entireties.

BACKGROUND

1. Field

This disclosure generally relates to the field of image capture. More particularly, the disclosure relates to a configuration that receives different sized mobile computing devices that performs image capture.

2. General Background

Standard cameras typically allow for utilization of a tripod. For example, a photographer can place a standard camera on a tripod so that movement of the camera during image capture is minimized. The tripod allows a photographer using a standard camera to take pictures without using both hands to stabilize the camera.

Current mobile computing devices, e.g., tablet devices, smartphones, etc., provide image capture capabilities, e.g., still or motion, that are comparable with standard image capture devices such as standard cameras. Yet the picture quality from such mobile computing devices is often of a lesser quality than that of standard cameras as standard cameras provide users with firmer stabilization abilities than a mobile computing device. Users often have difficulty keeping the mobile computing device stable during image capture. The mobile computing device often wobbles during the image capture, which then results in pictures or videos that are often of a less than ideal quality.

SUMMARY

In one aspect of the disclosure, an apparatus is provided. The apparatus has a first member, a second member, and a third member that couples the first member and the second member such that the second member is parallel to the first member. The third member is perpendicular to the first member and the second member. Further, the third member is in between the first member and the second member. The apparatus also has a receptacle connection device positioned on the third member that connects a receptacle to the apparatus. The receptacle is configured to receive an image capture computing device without an intervening member between an external perimeter of the image capture computing device and an external perimeter of the receptacle. The receptacle is configured to have an aperture positioned on a side of the third member between the first member and the second member.

In another aspect of the disclosure, an apparatus is provided. The apparatus has a first member, a second member, and a third member that couples the first member and the second member such that the second member is parallel to the first member. The third member is perpendicular to the first member and the second member. Further, the third member is in between the first member and the second member. The apparatus also has a receptacle connection device positioned on the third member that is capable of connecting a first receptacle or a second receptacle to the apparatus. The first receptacle is configured to receive a first image capture computing device without an intervening member between an external perimeter of the first image capture computing device and an external perimeter of the first receptacle. Further, the first receptacle is configured to have an aperture positioned on a side of the third member between the first member and the second member. In addition, the second receptacle is configured to receive a second image capture computing device without an intervening member between an external perimeter of the second image capture computing device and an external perimeter of the second receptacle. The second receptacle is configured to have an aperture positioned on a side of the third member between the first member and the second member. Further, the first receptacle has a first set of dimensions. In addition, the second receptacle has a second set of dimensions. The first set of dimensions is distinct from the second set of dimensions.

In yet another aspect of the disclosure, another apparatus is provided. The apparatus has a first member, a second member, and a third member. The third member couples the first member and the second member such that the second member is parallel to the first member, the third member is perpendicular to the first member and the second member, and the third member is in between the first member and the second member. Further, the apparatus has at least one slot integrated within a rear portion of the third member. In addition, the apparatus has an adjustable member positioned on a front portion of the third member that adheres a mobile computing device to the front portion of the third member. The adjustable member is adjusted within the at least one slot.

In another aspect of the disclosure, another apparatus is provided. The apparatus has a first member, a second member, a third member that couples the first member and the second member such that the second member is parallel to the first member, the third member is perpendicular to the first member and the second member, and the third member is in between the first member and the second member. Further, the apparatus has at least one slot integrated within a rear portion of the third member. In addition, the apparatus has an adjustable member positioned on a front portion of the third member that adheres a receptacle for a mobile computing device to the front portion of the third member. The adjustable member is adjusted within the at least one slot.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A receptacle for a computing device that performs image capture is provided. The image capture computing device is received by the receptacle. A user then grasps the receptacle and motions the receptacle to a position for image capture. The receptacle has handles that provide for stabilization of the receptacle and the image capture computing device. As a result, users performing image capture have the ability to capture still images and/or video images with stabilization. In contrast with heavy receptacles that do not have handles, the receptacle for the image capture computing device provides a lightweight configuration that provides stabilization for an image capture computing device.

Further, the receptacle is configured to provide optimal accessibility to various ports of the mobile computing device. In contrast with a configuration in which wires have to be bent in a manner that may damage the wires and be cumbersome for a user, the receptacle is configured to maximize accessibility to the mobile computing device and minimize interference from the wires.

In addition, the receptacle may have additional components that allow the user performing image capture to vary image capture conditions. For example, the receptacle may receive a variety of lenses that may be utilized to vary viewing conditions. Further, various lighting and/or audio equipment may be positioned on the receptacle to vary lighting and/or audio conditions. The receptacle may also have a tripod component so that the receptacle may be stabilized with a tripod to minimize motion of the image capture computing device during image capture.

Figure 1:
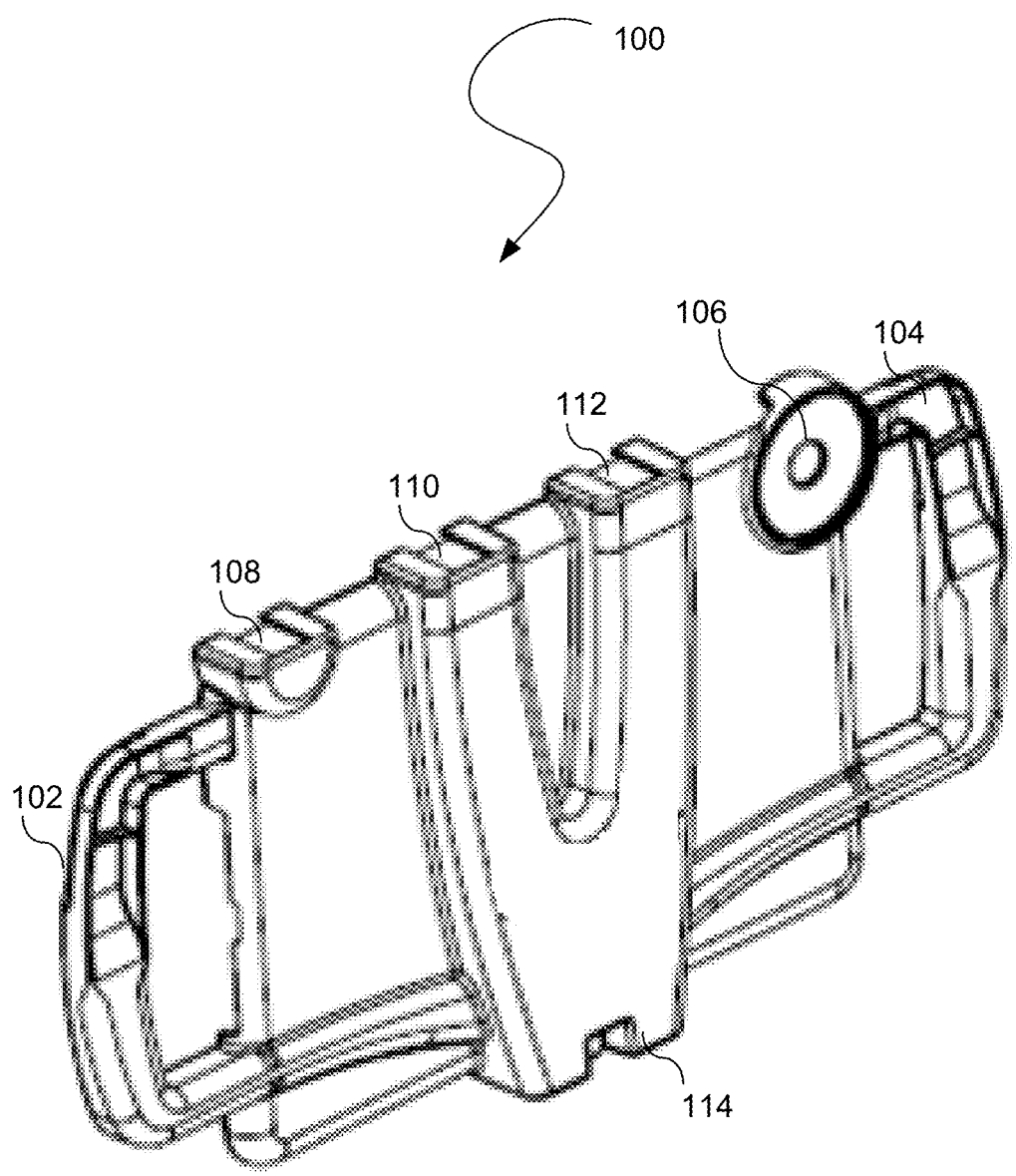
FIG. 1 illustrates a front view of an image capture computing device receptacle.

FIG. 1 illustrates a front view of an image capture computing device receptacle 100. In one embodiment, the image capture computing device receptacle 100 includes a plurality of handles, e.g., a right handle 102 and a left handle 104. The front of the image capture computing device receptacle 100 is illustrated from the perspective of what another user views if in front of the image capture computing device 100 when an image is captured by a user such as a photographer. The right handle 102 and the left handle 104 allow the user to perform image capture with minimal wobbling. As a result, the photographer is able to perform image capture with more stabilization and accuracy than without the image capture computing device receptacle 100. Although the right handle 102 and the left handle 104 are illustrated, the handles may be in other locations, e.g., a top handle and a bottom handle. Further, a single handle or more than two handles may be utilized. The right handle 102 and the left handle 104 are provided merely for illustrative purposes.

The image capture computing device receptacle 100 also has an aperture 106. The aperture 106 is configured so that an image capture component, e.g., a lens of a mobile image capture computing device, may be positioned to capture images through the aperture 106. In one embodiment, the aperture 106 is configured to be in substantial proximity to the image capture component. For example, the aperture may be narrow enough to only be positioned over the lens to minimize reflection.

In another embodiment, the image capture computing device receptacle 100 has a plurality of accessory receiving means. As an example, the image capture computing device receptacle 100 has a receiving means 108, a receiving means 110, a receiving means 112, and a receiving means 114. The various receiving means may be utilized to receive accessories such as lighting devices, e.g., lamps, audio devices, e.g., microphones, additional lenses, e.g., wide angle lenses, tripods, and/or the like. For example, the receiving means 114 may receive a tripod mount to provide further stabilization for the image capture computing device receptacle 100 with a tripod. A single or different quantity of receiving means may be utilized from that illustrated in FIG. 1.

In one embodiment, the right handle 102 and the left handle 104 are integrated within the same frame as the image capture computing device receptacle 100. In other words, a single molding may be utilized for the frame and the handles. In an alternative embodiment, the right handle 102 and the left handle are detachable from the frame.

Figure 2:
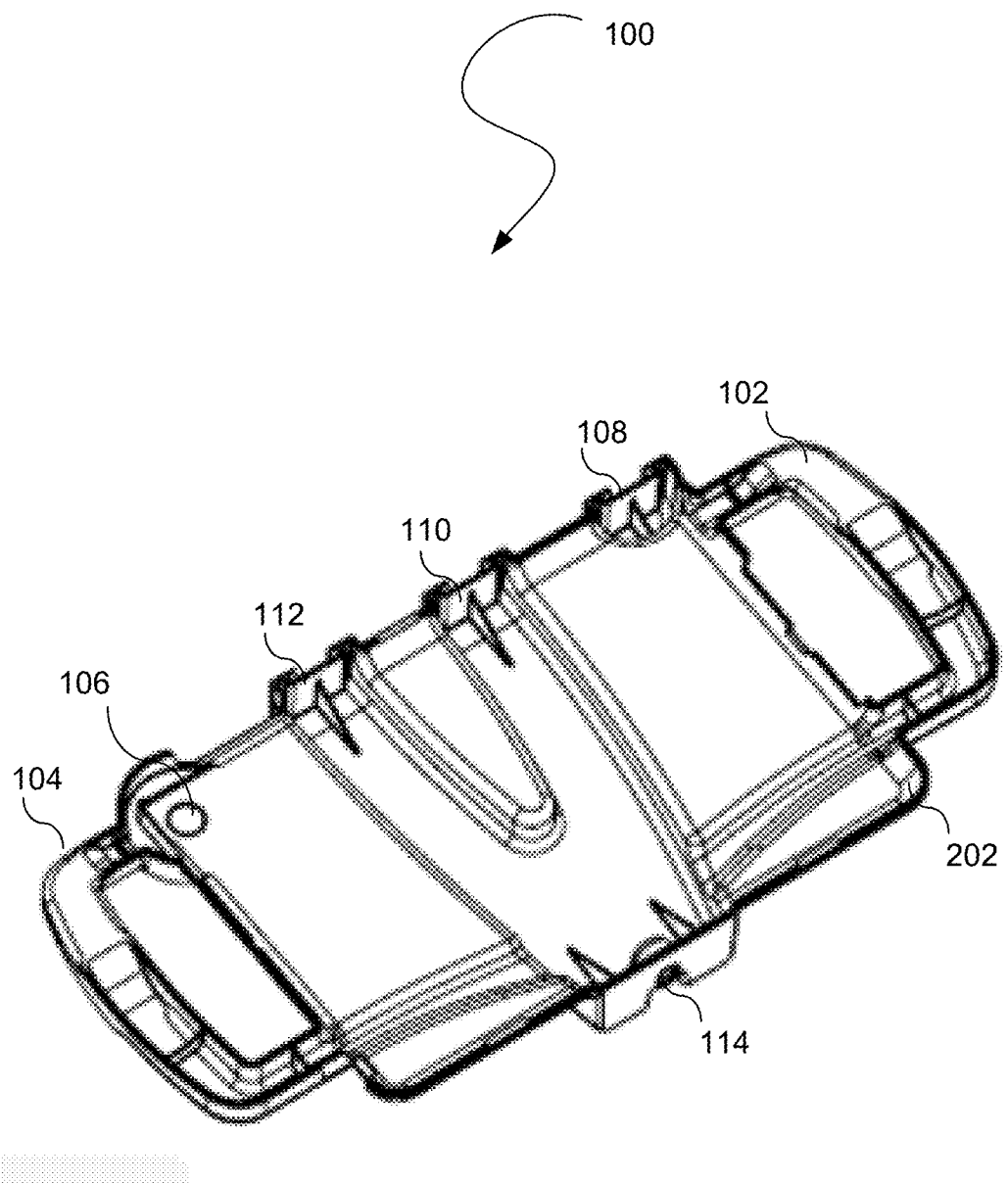
FIG. 2 illustrates a back view of the image capture computing device receptacle.

FIG. 2 illustrates a back view of the image capture computing device receptacle 100. The back view is from the perspective of the photographer that is placing the mobile computing device in the image capture computing device receptacle 100. In one embodiment, the image capture computing device receptacle 100 has a receiving means for receiving the image capture computing device receptacle 100. An example of the receiving means is the lip 202. The lip 202 may be positioned throughout all of the frame or at least a portion of the frame. A photographer may then snap the mobile computing device within the lip to secure the mobile computing device in the image capture computing device receptacle 100. As a result, the photographer may easily snap the mobile computing device into position. The lip is only an example of the receiving means. The receiving means may also be a fastening means such as a screw, bolt, nail, clip, and/or the like.

Figure 3:
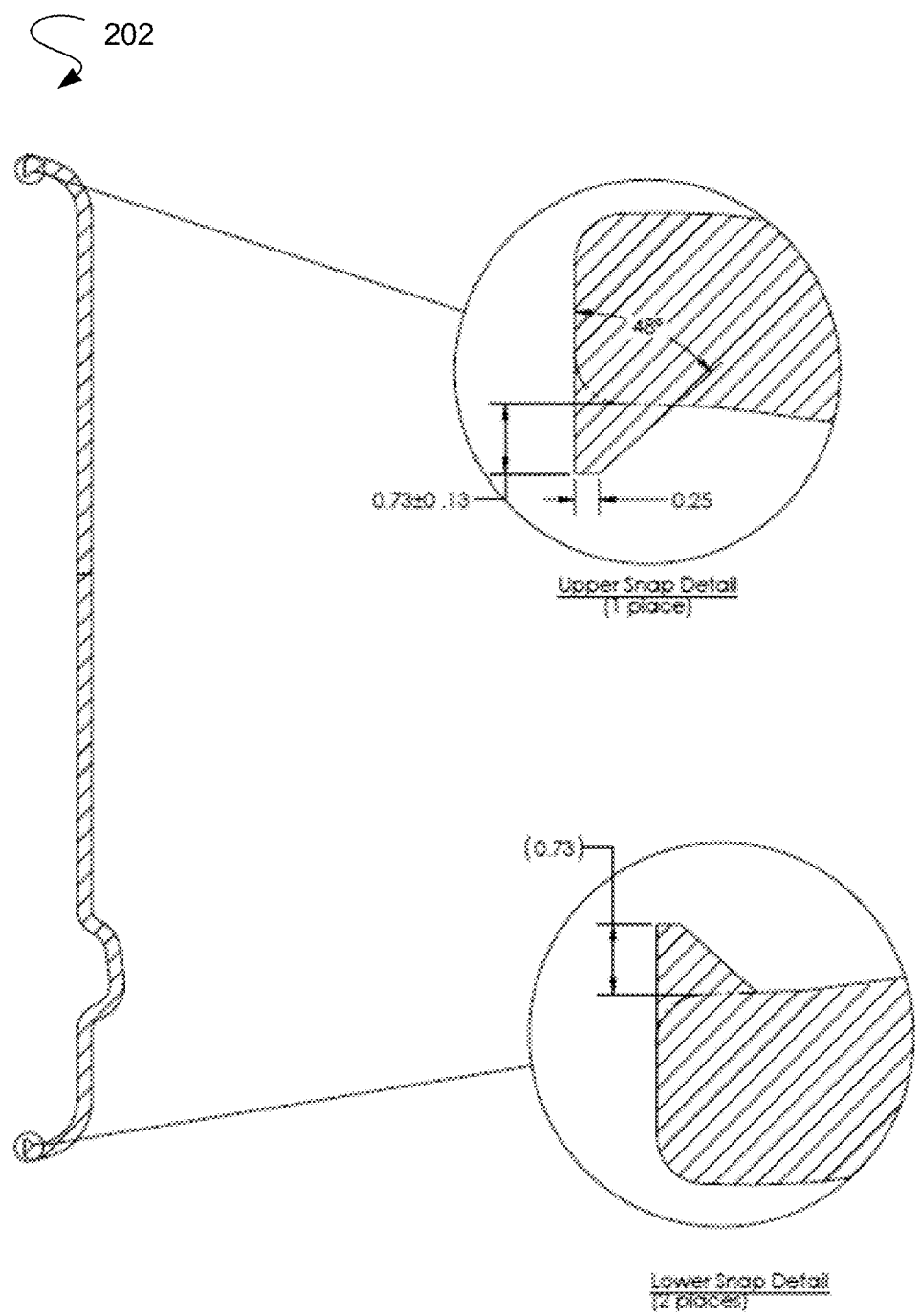
FIG. 3 illustrates a side view of the receiving means.

FIG. 3 illustrates a side view of the receiving means 202. The receiving means 202 is illustrated as a lip only for illustrative purposes as various other receiving means may be utilized.

Figure 4:
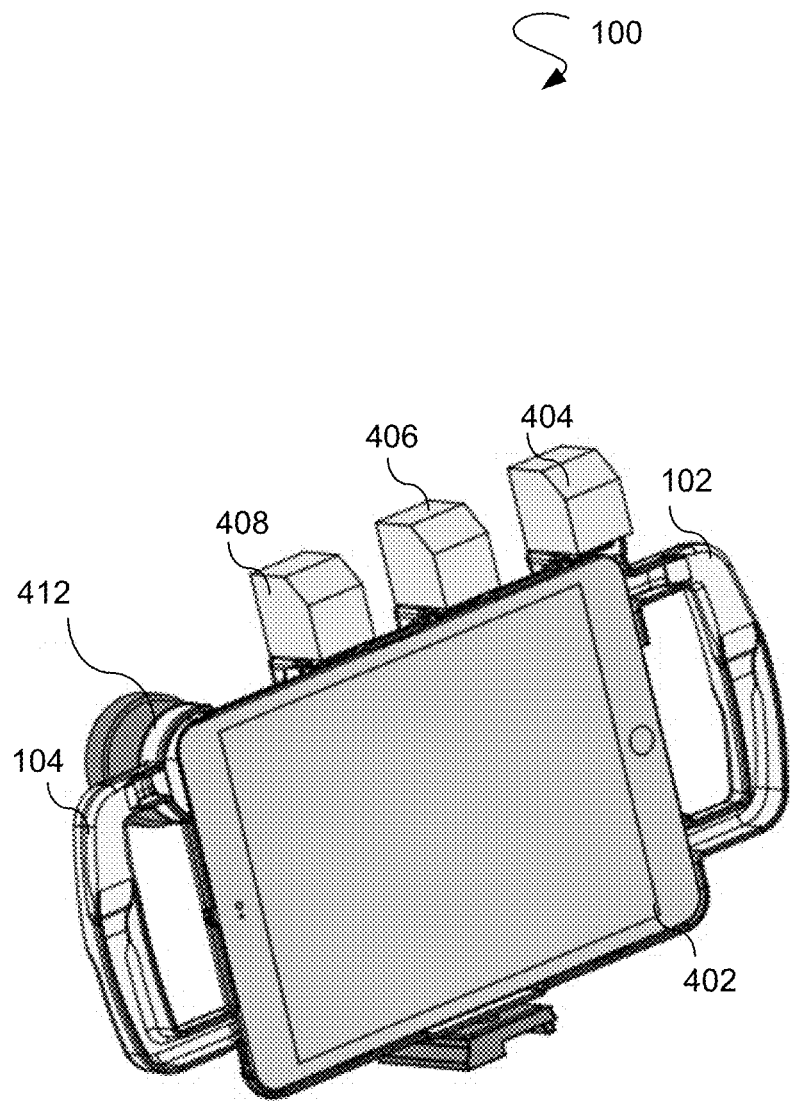
FIG. 4 illustrates a front view of the image capture computing device receptacle with a mobile computing device secured to the image capture computing device receptacle.

FIG. 4 illustrates a front view of the image capture computing device receptacle 100 with a mobile computing device 402 secured to the image capture computing device receptacle 100. The mobile computing device 402 may be a tablet device, smartphone, or any other mobile device. Further, the mobile computing device 402 may have an image capture component, e.g., a built in camera, for still or motion image capture. Various accessories 404, 406, and 408 may be connected to the receiving means 108, 110, and 112. The receiving means 108, 110, and 112 may be a lip, screw, bolt, nail, clip, and/or the like. Further, a lens accessory 412 is positioned over the aperture 106.

Although a frame single frame is illustrated in FIG. 4, multiple frames may alternatively be utilized to secure the mobile computing device 402. In other words, the image capture computing device receptacle 100 may comprise multiple parts such as a front portion and a back portion to secure the mobile computing device 402 to the image capture computing device receptacle 100. Accordingly, the image capture computing device receptacle 100 is not limited to a single frame as multiple frames may alternatively be utilized.

Figure 5:
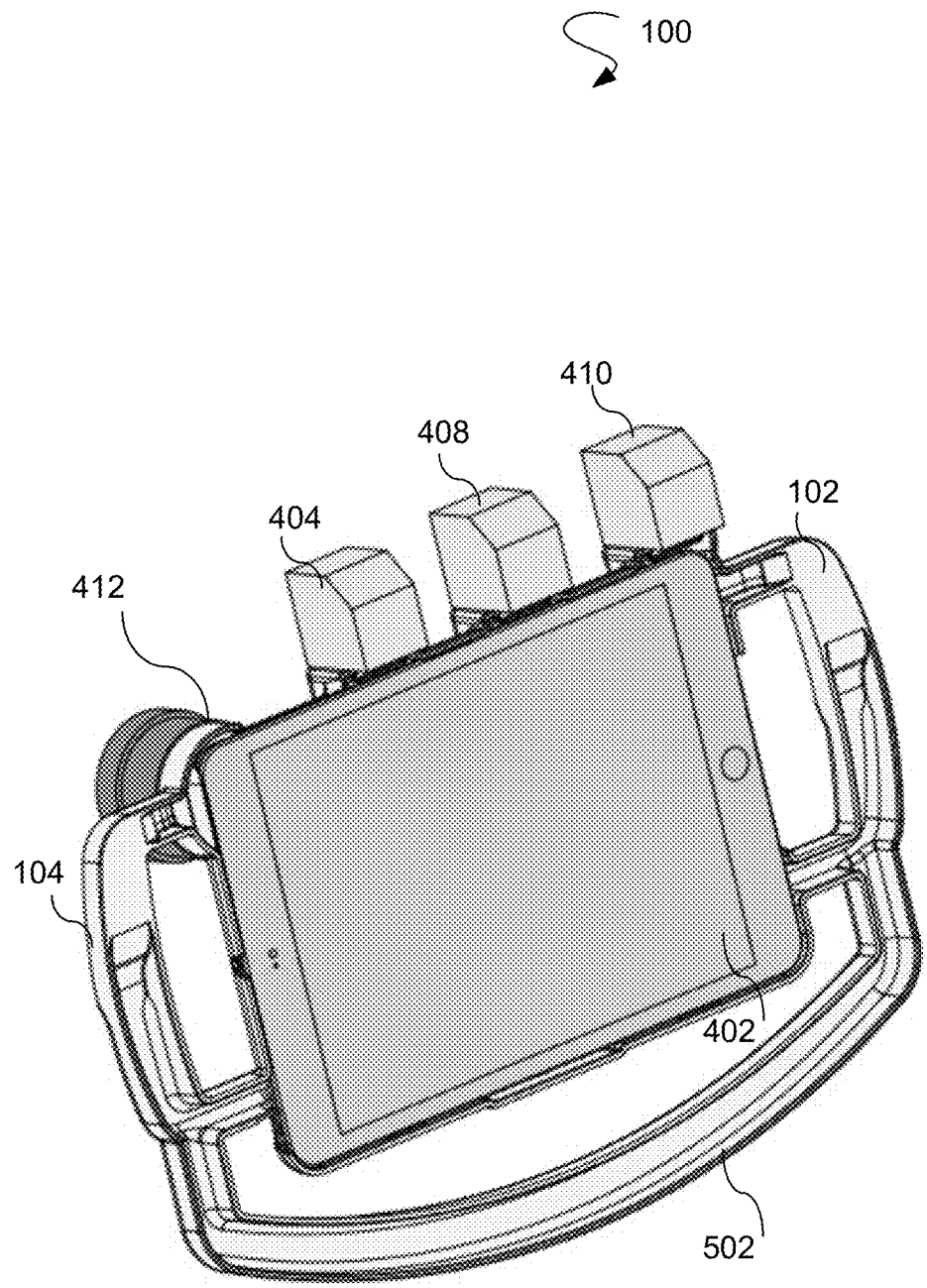
FIG. 5 illustrates a front view of the image capture computing device receptacle 100 with the mobile computing device secured to the image capture computing device receptacle and the image capture computing device receptacle having a bottom handle.

Although FIGS. 1-4 illustrated two handles, a single handle or more than two handles may be utilized. FIG. 5 illustrates a front view of the image capture computing device receptacle 100 with the mobile computing device 402 secured to the image capture computing device receptacle 100 and the image capture computing device receptacle 100 having a bottom handle 502. Alternatively, the right handle 102, the left handle 104, and the bottom handle 502 may be considered a single handle. Further, FIG. 6 illustrates a front view of the image capture computing device receptacle 100 with the mobile computing device 402 secured to the image capture computing device receptacle 100 and the image capture computing device receptacle 100 only having the left handle 104 for a handle.

Figure 6:
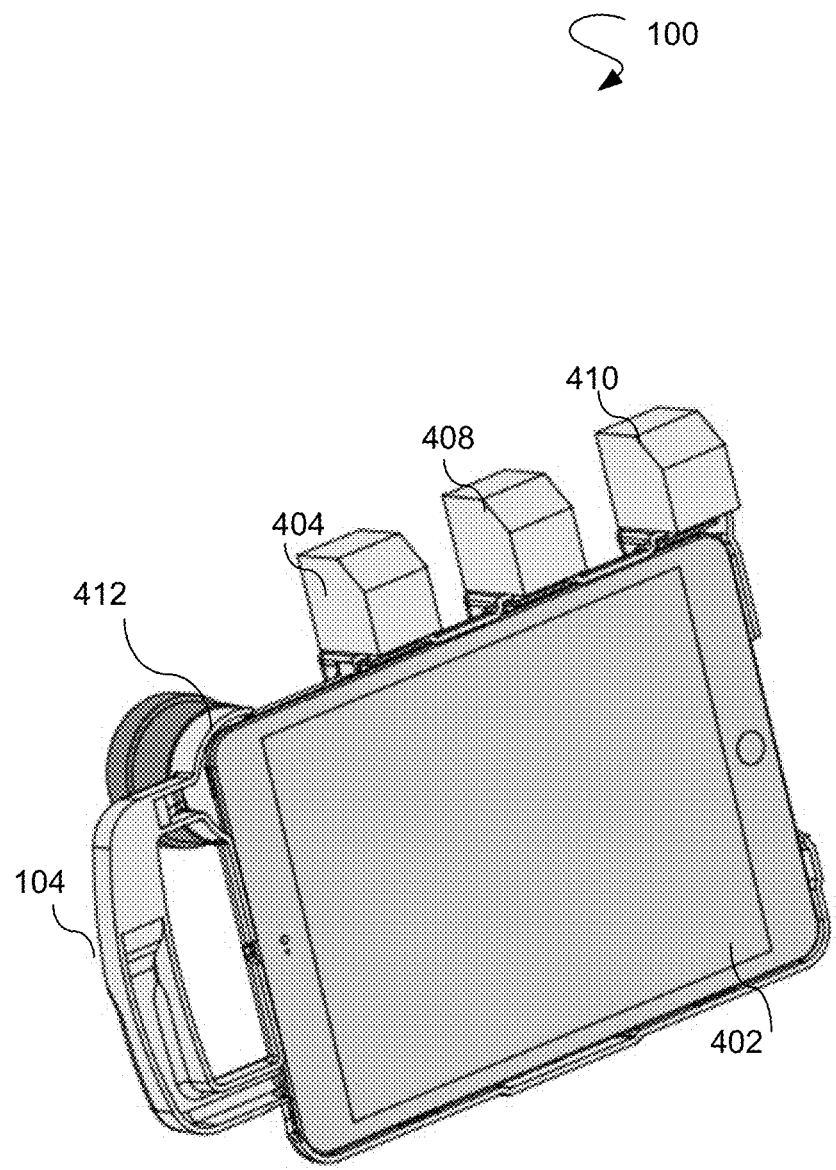
FIG. 6 illustrates a front view of the image capture computing device receptacle with the mobile computing device secured to the image capture computing device receptacle and the image capture computing device receptacle only having the right handle for a handle.
Figure 7:
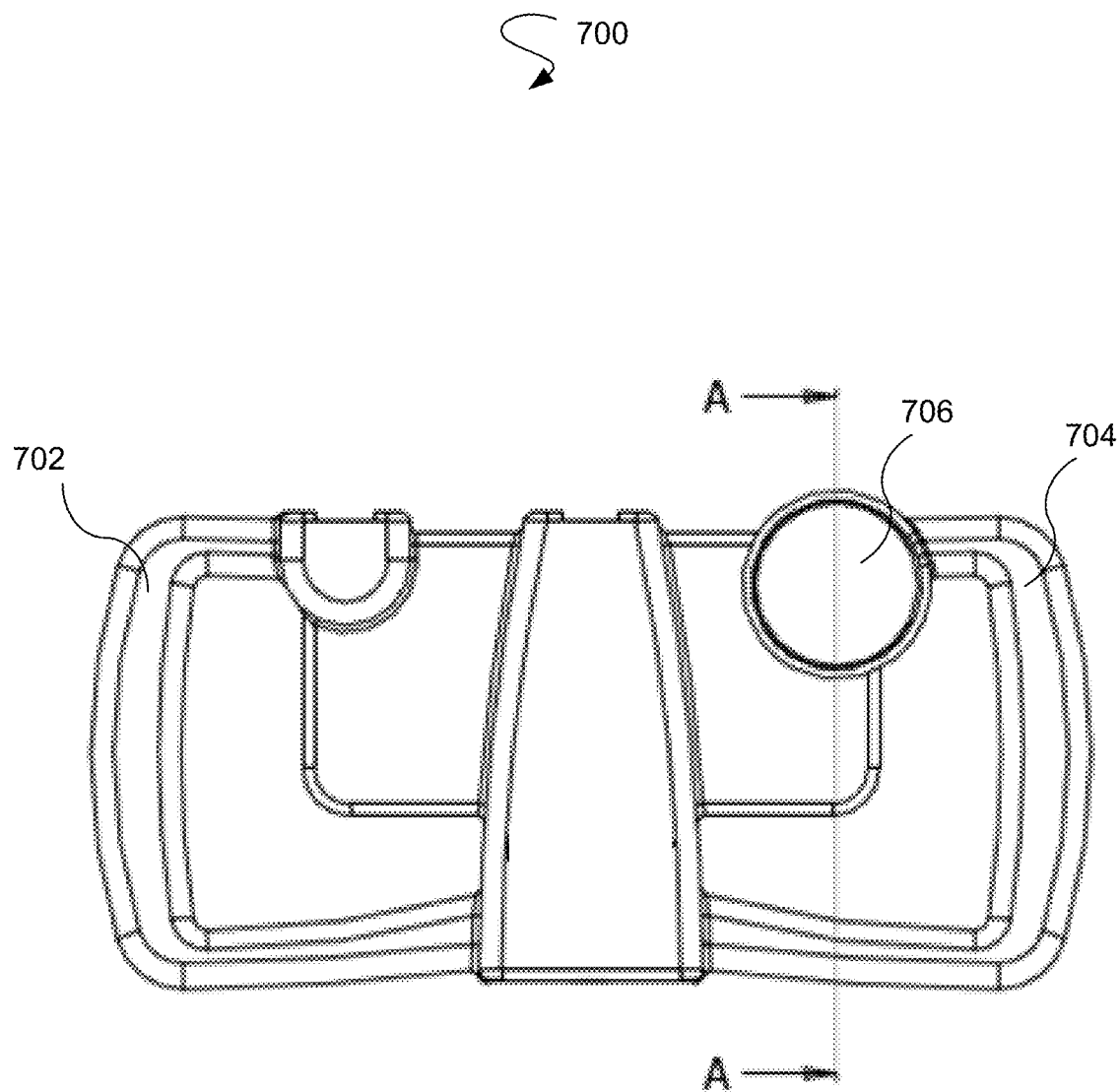
FIG. 7 illustrates a front view of an image capture computing device receptacle that is configured to receive a smartphone.
Figure 8:
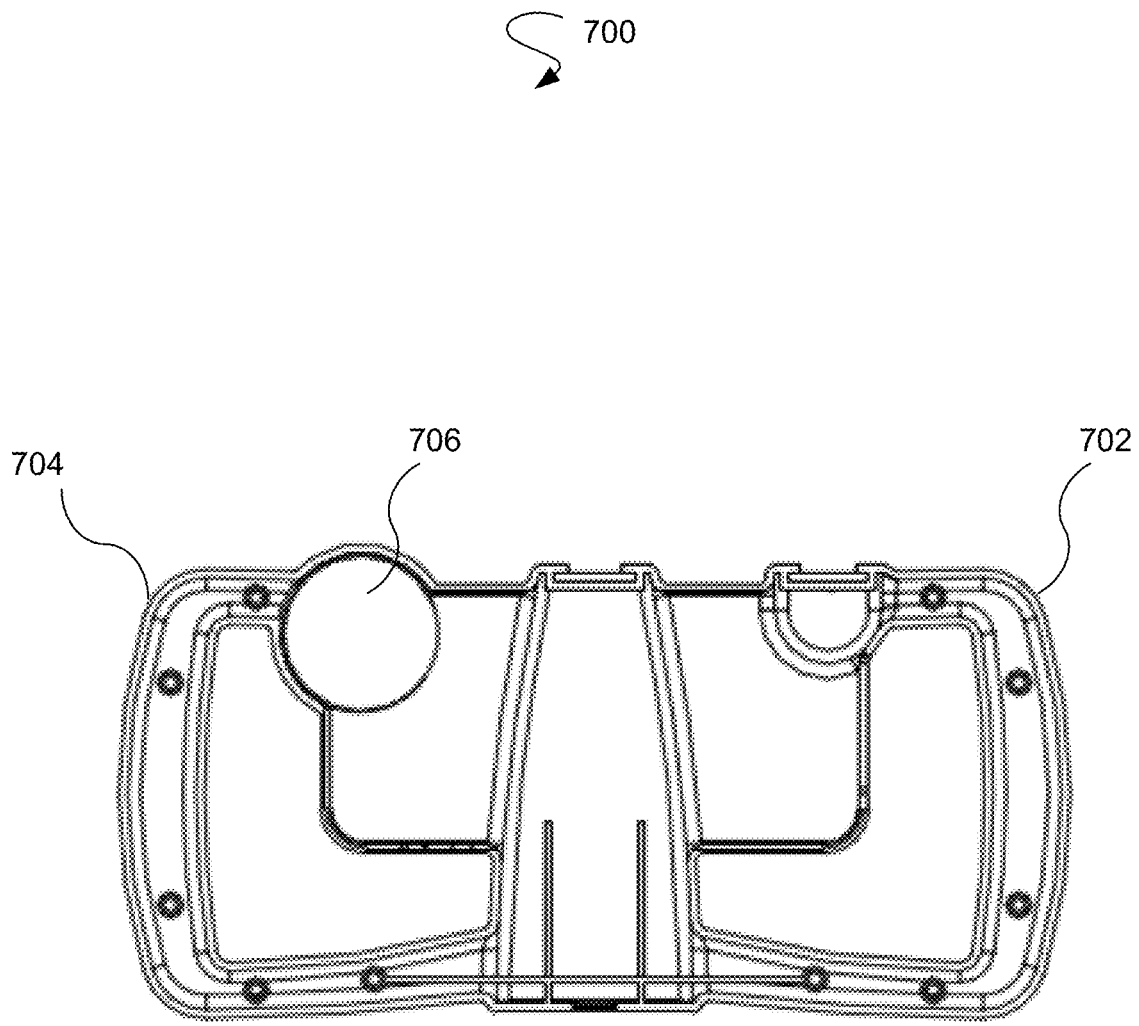
FIG. 8 illustrates a back view of the image capture computing device receptacle illustrated in FIG. 7.

Although FIGS. 4-6 illustrate the mobile computing device 402 as a tablet device, a smartphone may alternatively be utilized. Accordingly, FIG. 7 illustrates a front view of an image capture computing device receptacle 700 that is configured to receive a smartphone. The image capture computing device receptacle 700 has a right handle 702 and a left handle 704. The image capture computing device receptacle 700 also has an aperture 706. FIG. 8 illustrates a back view of the image capture computing device receptacle 700 illustrated in FIG. 7.

FIGS. 9A-9D illustrate various views of a flat handle configuration of the image capture computing device receptacle 100 illustrated in FIG. 1. The flat handle configuration has handles that are in vertical alignment with the vertical plane that goes through the image capture computing device receptacle 100. As a result various wires that are plugged into the mobile computing device 402 of FIG. 4 have to be bent, twisted, etc. to have accessibility to receiving ports of the mobile computing device 402 of FIG. 4. Such wires may be utilized to connect the image capture computing device 100 to various accessories, other devices, etc. The ports may be based on various technologies such as USB, Ethernet, etc.

Figure 9A:
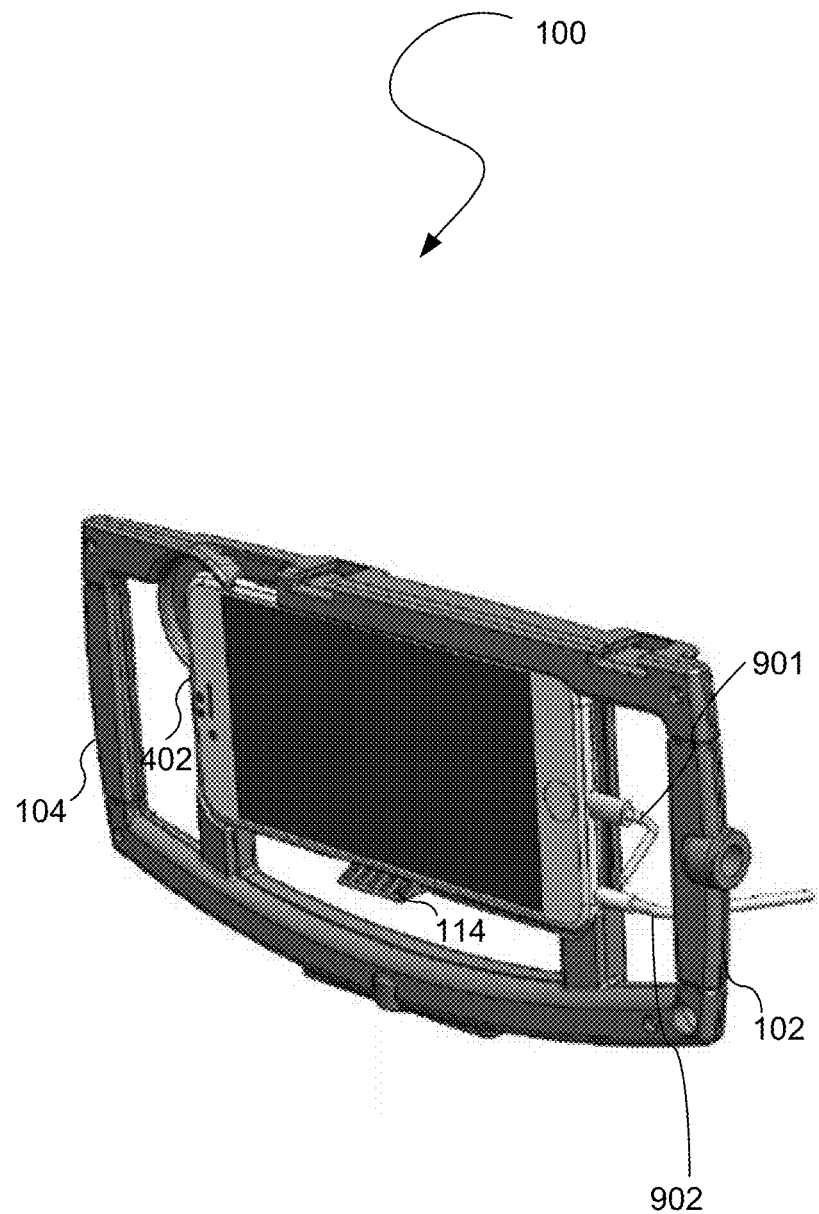
FIG. 9A illustrates a front perspective view of the flat handle configuration of the image capture computing device receptacle.

FIG. 9A illustrates a front perspective view of the flat handle configuration of the image capture computing device receptacle 100. The right handle 102 and the left handle 104 are in vertical alignment with the image capture computing device receptacle 100. As a result, a lighting cable 901 and a headphone cable 902 do not have direct accessibility to receiving ports of the mobile computing device 402. Therefore, the cables 901 and 902 have to be significantly bent, e.g., at approximate ninety degree angles, to obtain access to the receiving ports of the mobile computing device 402 of FIG. 4.

Such awkward bending may lead to significant damage or wear and tear of the cables 901 and 902. Further, the cables 901 and 902 may easily become unplugged from the receiving ports of the mobile computing device 402 of FIG. 4 as such bending does not allow for secure plugging of the cables 901 and 902. Such unplugging may lead to significant disruptions during filming, image capture, etc.

Further, the bending of the cables 901 and 902 interferes with a user's ability to comfortably grip the handles 102 and 104. For example, the bends of the cables 901 and 902 may occupy significant amounts of gripping space between the handles 102 and 104 and the portion of the image capture computing device receptacle 100 that encapsulates the mobile computing device 402. As a result, the bends of the cables 901 and 902 may block certain portions of the handles 102 and 104 from being gripped by the user.

Figure 9B:
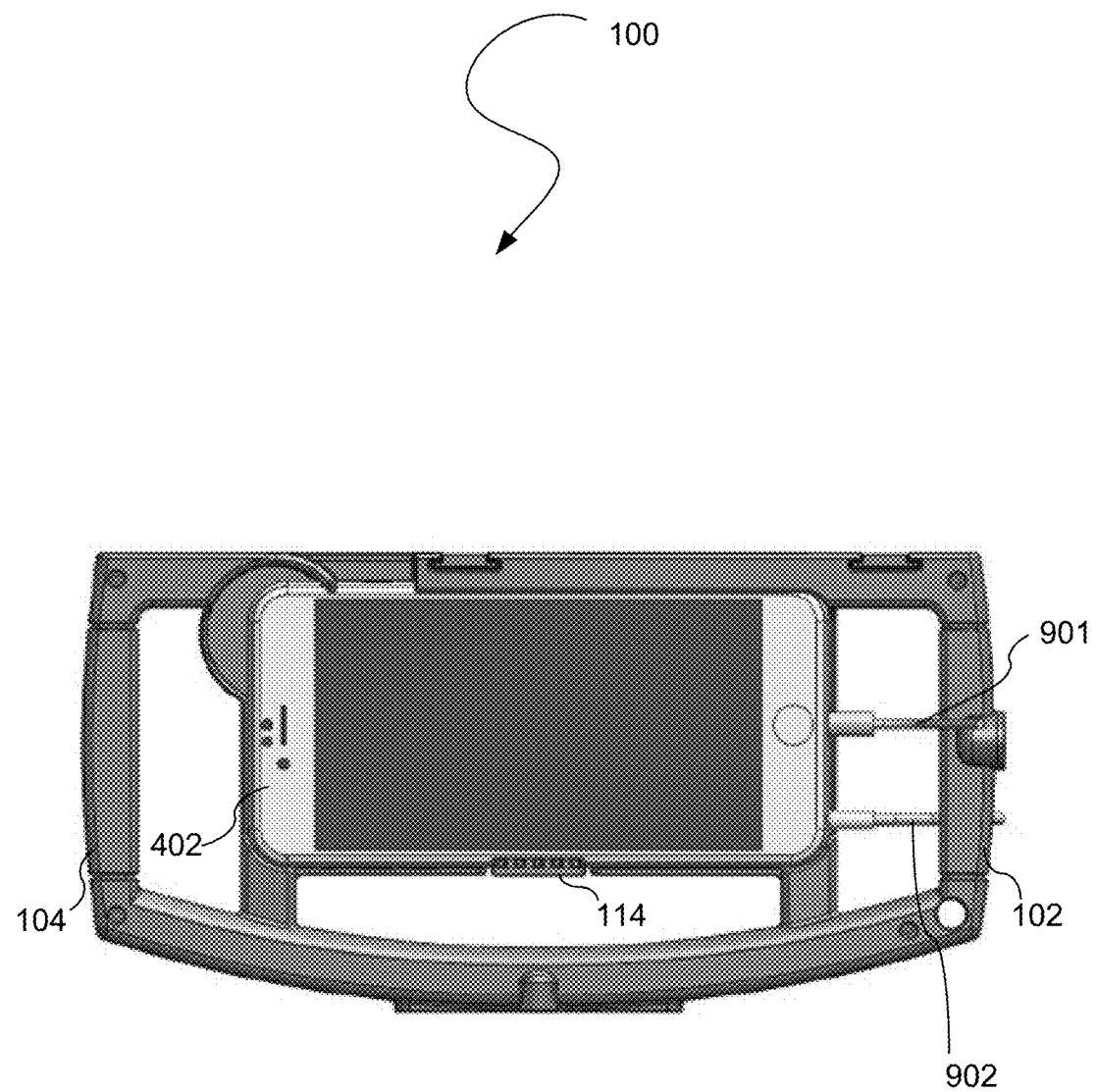
FIG. 9B illustrates a front view of the flat handle configuration of the image capture computing device receptacle illustrated in FIG. 9A.
Figure 9C:
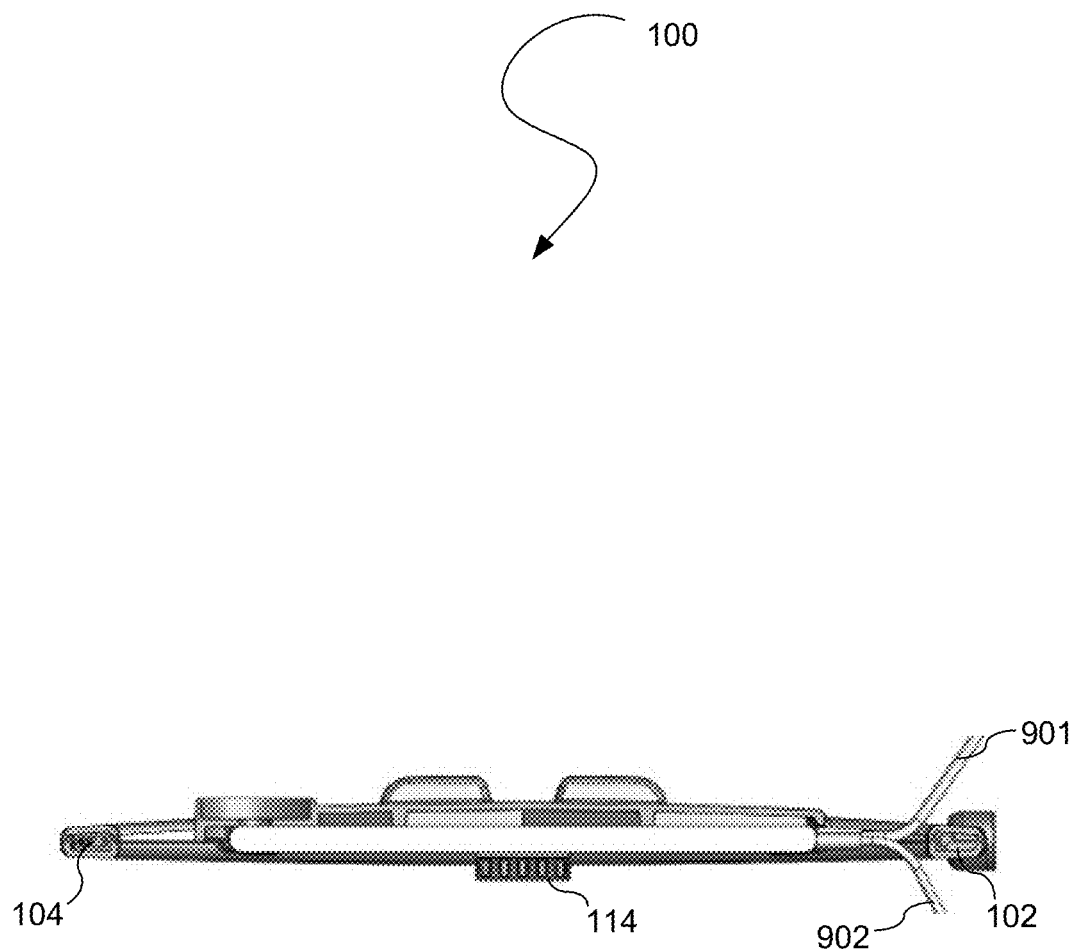
FIG. 9C illustrates a side view of the flat handle configuration of the image capture computing device receptacle illustrated in FIG. 9A.
Figure 9D:
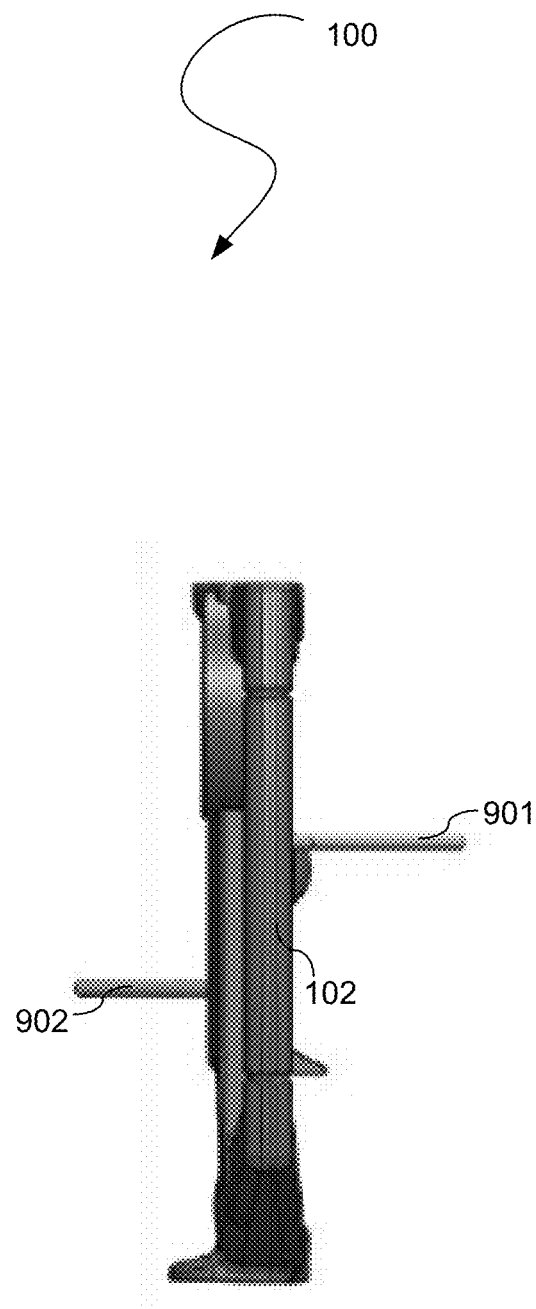
FIG. 9D illustrates another side view of the flat handle configuration of the image capture computing device receptacle illustrated in FIG. 9A.

FIG. 9B illustrates a front view of the flat handle configuration of the image capture computing device receptacle 100 illustrated in FIG. 9A. Further, FIG. 9C illustrates a side view of the flat handle configuration of the image capture computing device receptacle 100 illustrated in FIG. 9A. The cables 901 and 902 are illustrated as being significantly bent at almost ninety degree angles. In addition, FIG. 9D illustrates another side view of the flat handle configuration of the image capture computing device receptacle 100 illustrated in FIG. 9A.

The lighting cable 901 and the headphone cable 902 are only provided as examples of cables that may be utilized with the receiving ports of the mobile computing device 402. Other types of cables may also be utilized. Further, devices other than cables that may be received by the mobile computing device 402, e.g., USB devices, etc., may also be received by the receiving ports of the mobile computing device 402.

In yet another implementation, an apparatus is able to connect to a receptacle for the mobile computing device 402. The apparatus allows for connection of various sized receptacles that each fit a particular mobile computing device 402. In other words, the same apparatus may be utilized to connect to various receptacles of different sizes so that the same apparatus may be utilized to perform image capture for different sized mobile computing devices 402.

Figure 10A:
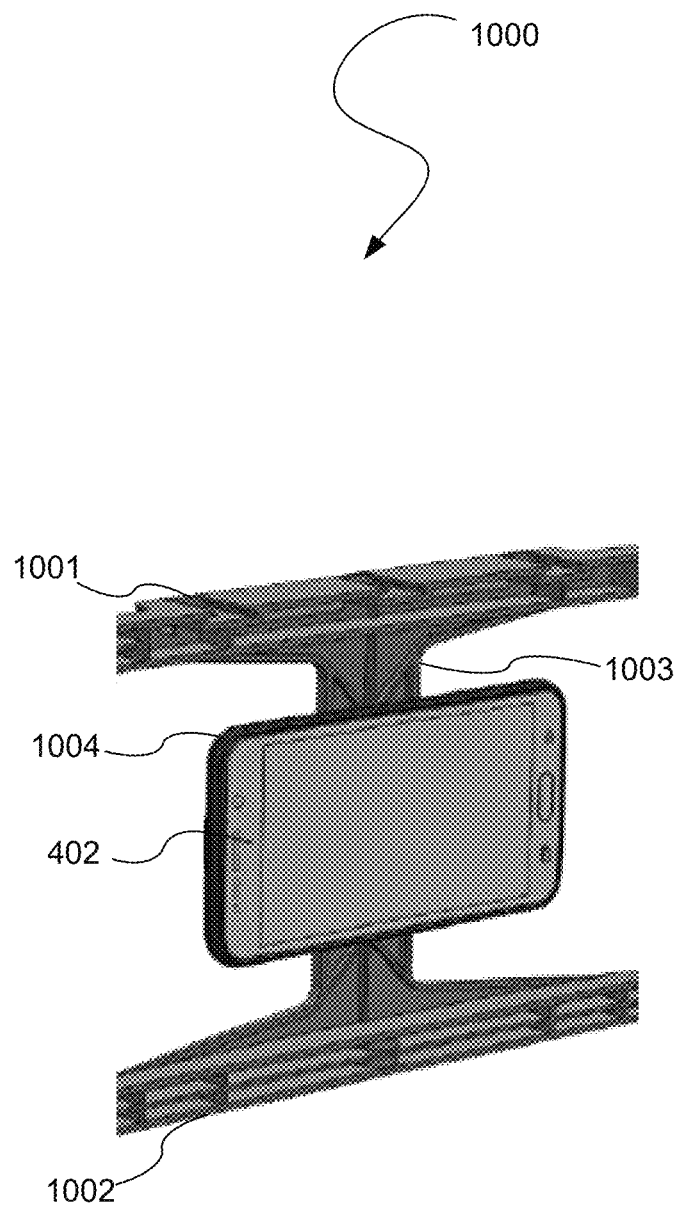
FIG. 10A illustrates a front perspective view of an example of the apparatus.
Figure 10B:
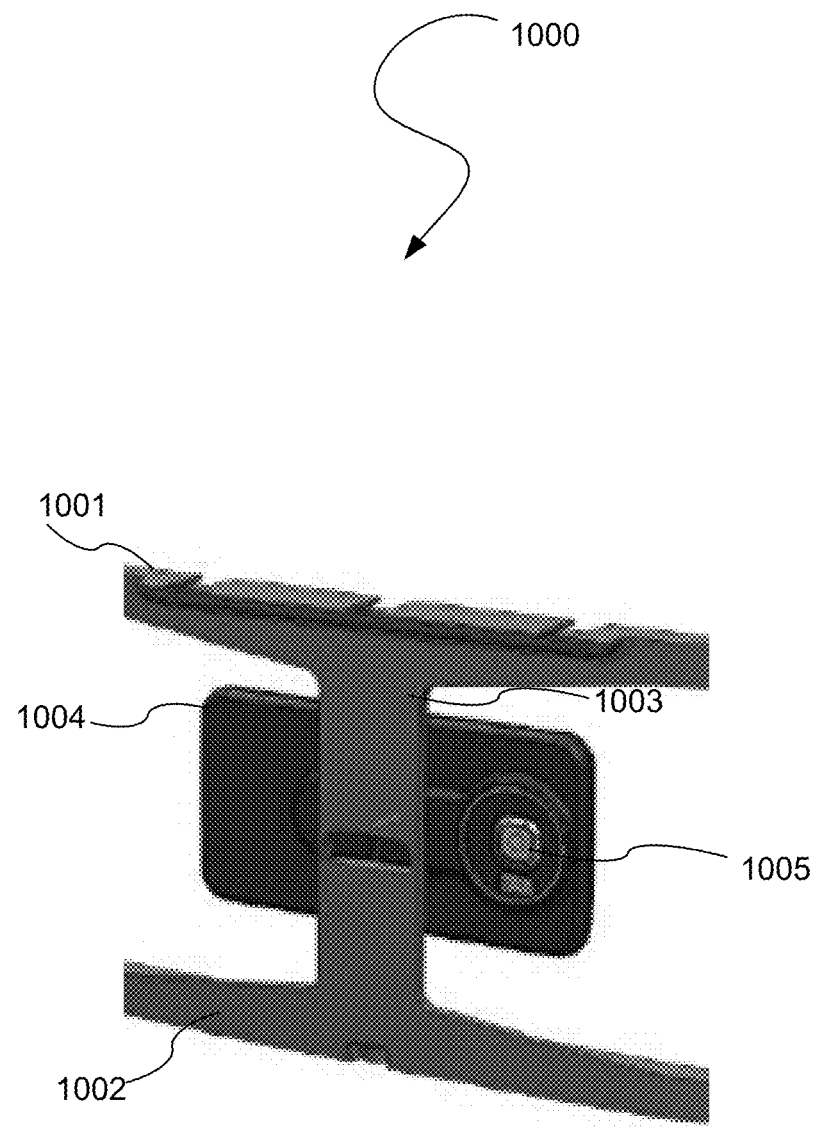
FIG. 10B illustrates a rear perspective view of the example of the apparatus illustrated in FIG. 10A.

FIGS. 10A and 10B illustrate various views of an apparatus 1000 that may receive different sized receptacles for mobile computing devices 402. FIG. 10A illustrates a front perspective view of an example of the apparatus 1000. The apparatus 1000 receives a first member 1001 and a second member 1002 that are parallel to each other. Further, the apparatus 1000 has a third member 1003 that couples the first member and the second member. For example, the third member 1003 may be positioned in between and perpendicular to the first member 1001 and the second member 1002.

Further, a receptacle 1004 is connected to the third member 1003. The receptacle 1004 is configured to receive the mobile computing device 402 without an intervening member between an external perimeter of the mobile computing device 402 and an external perimeter of the receptacle 1004. In other words, the receptacle 1004 conforms to the shape of the mobile computing device 402. As an example, the receptacle 1004 may be configured so that no space is present between the external perimeter of the mobile computing device 402 and the external perimeter of the receptacle 1004.

The receptacle 1004 may be detached from the apparatus 1000. As a result, different sized receptacles 1004 that accommodate different sized mobile computing devices 402 may be detached and connected to the same apparatus 1000. For example, a user may attach a first receptacle 1004 to accommodate a particular smartphone and then detach that first receptacle 1004 so that a second receptacle 1004 may be attached to accommodate a different sized smartphone. Further, different types of devices with different sizes may be accommodated via the apparatus 1000. For instance, a user may attach a first receptacle 1004 to accommodate a particular smartphone and then detach that first receptacle 1004 so that a second receptacle 1004 may be attached to accommodate a tablet device.

FIG. 10B illustrates a rear perspective view of the example of the apparatus 1000 illustrated in FIG. 10A. The receptacle 1004 has an aperture 1005 next to which a lens of the mobile computing device 402 is positioned. The aperture 1005 is positioned on a side of the third member 1003 so that the aperture 1005 has an unobstructed view for image capture.

Figure 11A:
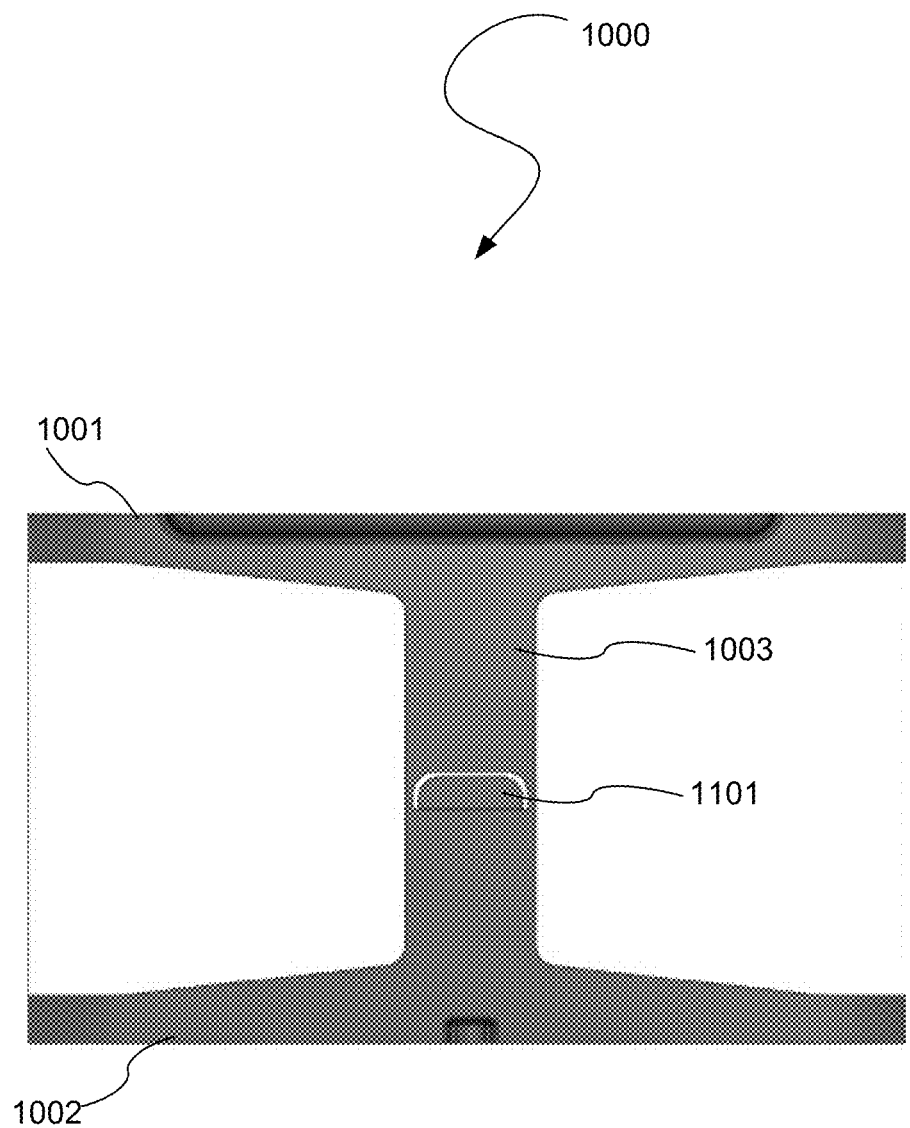
FIG. 11A illustrates a front perspective view of the apparatus.
Figure 11B:
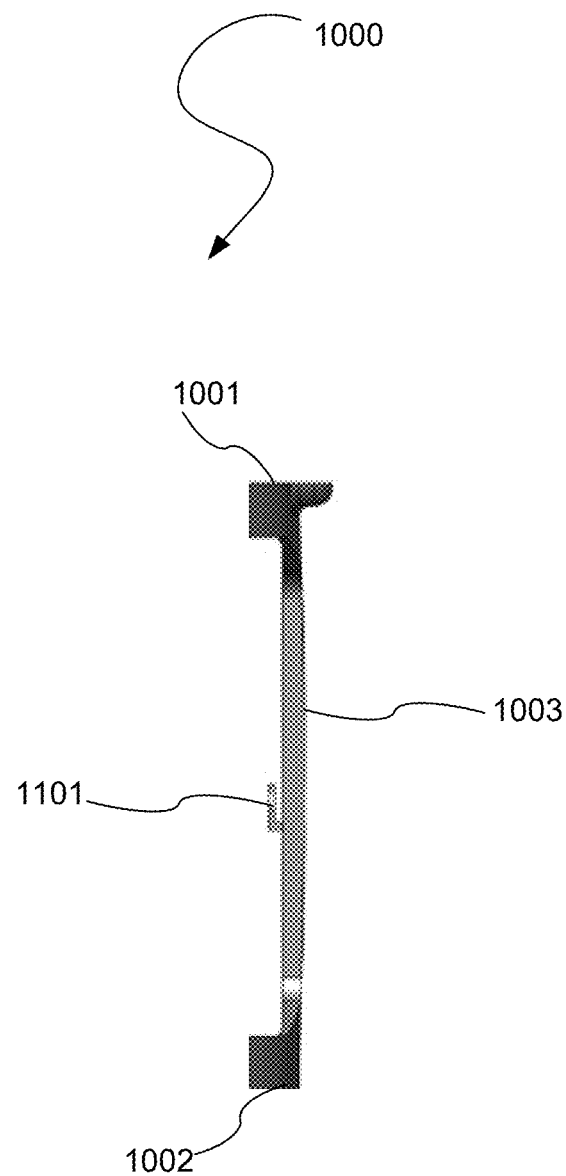
FIG. 11B illustrates a side view of the apparatus illustrated in FIG. 11A.

FIGS. 11A and 11B illustrate various view of the apparatus 1000 illustrated in FIG. 10 without the receptacle 1004 being connected to the third member 1003. FIG. 11A illustrates a front perspective view of the apparatus 1000. The apparatus 1000 has a receptacle connection device 1101 that connects the receptacle 1004 to the apparatus. For instance, the receptacle connection device 1101 may be a clip. FIG. 11B illustrates a side view of the apparatus 1000 illustrated in FIG. 11A.

Figure 12:
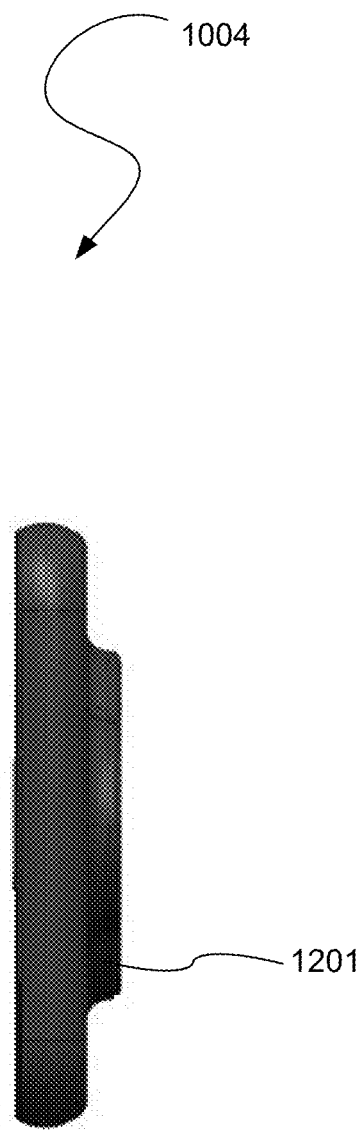
FIG. 12 illustrates a receptacle receiver that receives the receptacle connection device.

FIG. 12 illustrates a receptacle receiver 1201 that receives the receptacle connection device 1101. In other words, the receptacle receiver 1201 is positioned to connect the receptacle 1004 to the receptacle connection device 1101 of the apparatus 1000.

Figure 13A:
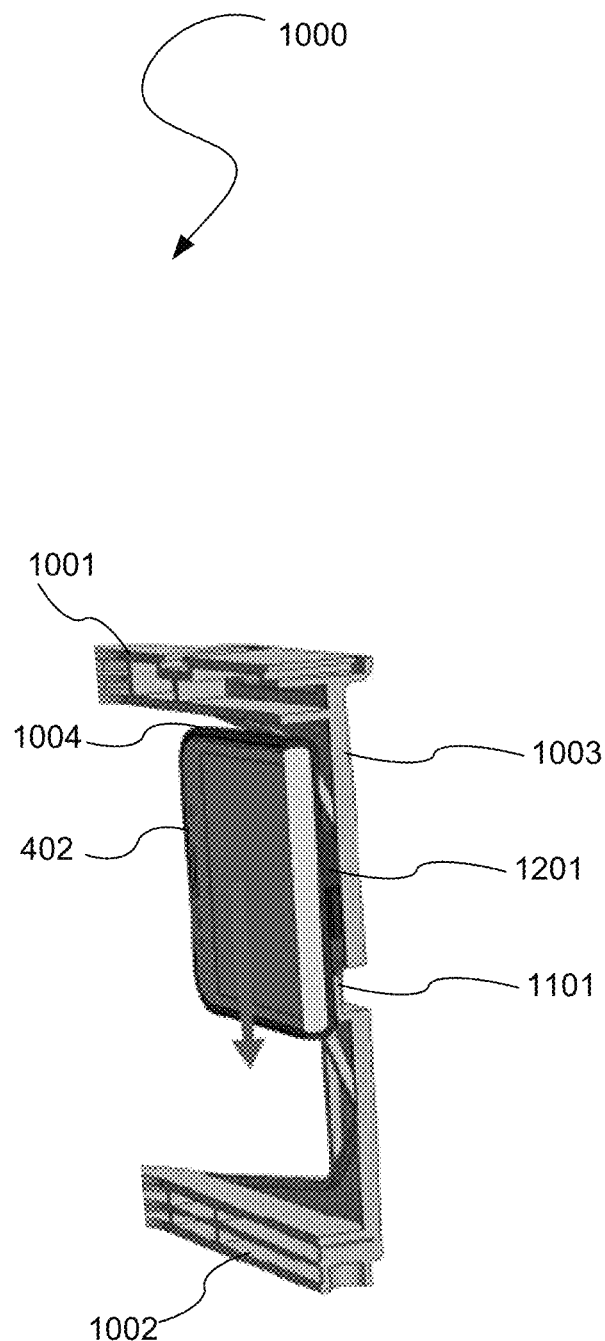
FIG. 13A illustrates the receptacle receiver being positioned above the receptacle connection device so that the receptacle receiver may slide in a downward motion on to the receptacle connection device.
Figure 13B:
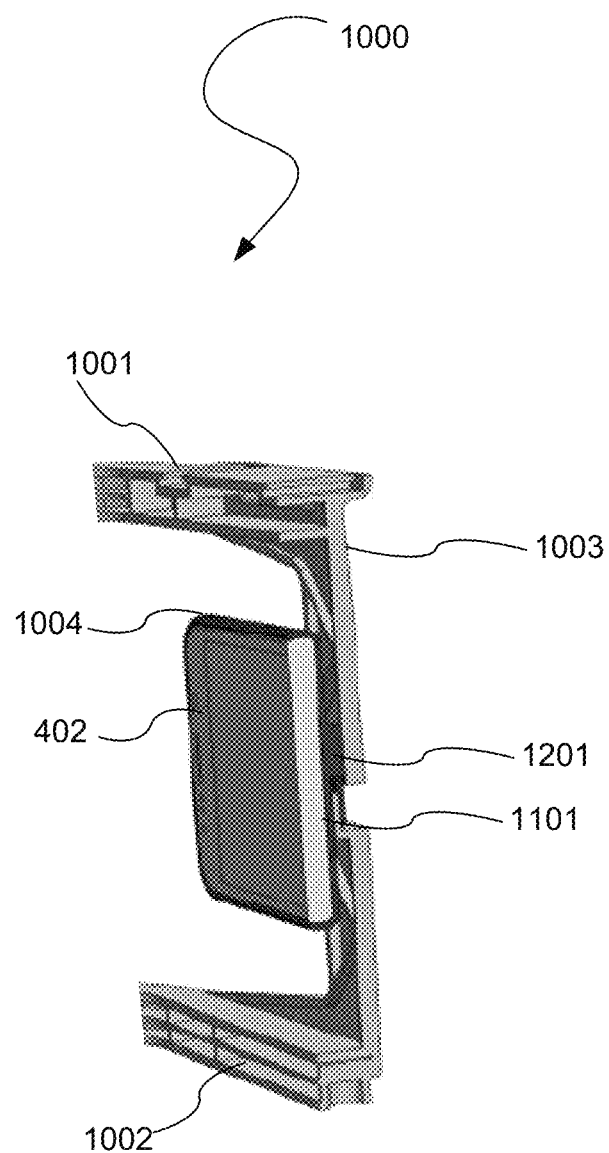
FIG. 13B illustrates the receptacle being attached to the apparatus as a result of the receptacle receiver being slid on to the receptacle connection device.

FIGS. 13A and 13B illustrates a partial perspective view of the receptacle 1004 being connected to the apparatus 1000. FIG. 13A illustrates the receptacle receiver 1201 being positioned above the receptacle connection device 1101 so that the receptacle receiver 1201 may slide in a downward motion on to the receptacle connection device 1101. FIG. 13B illustrates the receptacle 1004 being attached to the apparatus 1000 as a result of the receptacle receiver being slid on to the receptacle connection device 1101.

In an alternative implementation, the receptacle connection device 1101 may be positioned on the receptacle 1004, and the receptacle receiver 1201 may be positioned on the third member 1003 of the apparatus. In another alternative implementation, the receptacle connection device 1101 or the receptacle receiver 1201 may be positioned on the first member 1001 or the second member 1002.

Figure 14A:
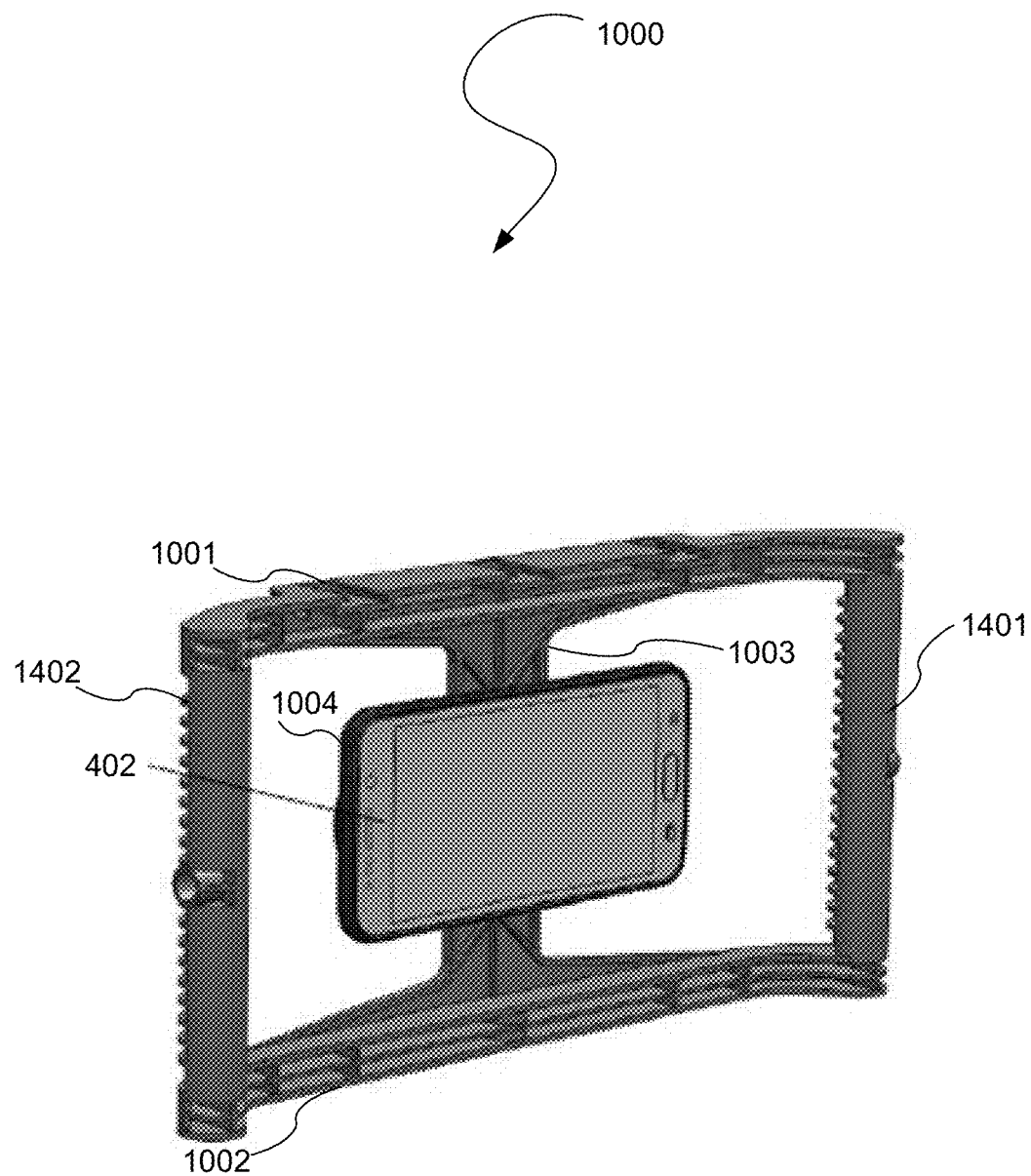
FIG. 14A illustrates a front perspective view of a handle configuration in which a right handle and a left handle are integrated into the apparatus.
Figure 14B:
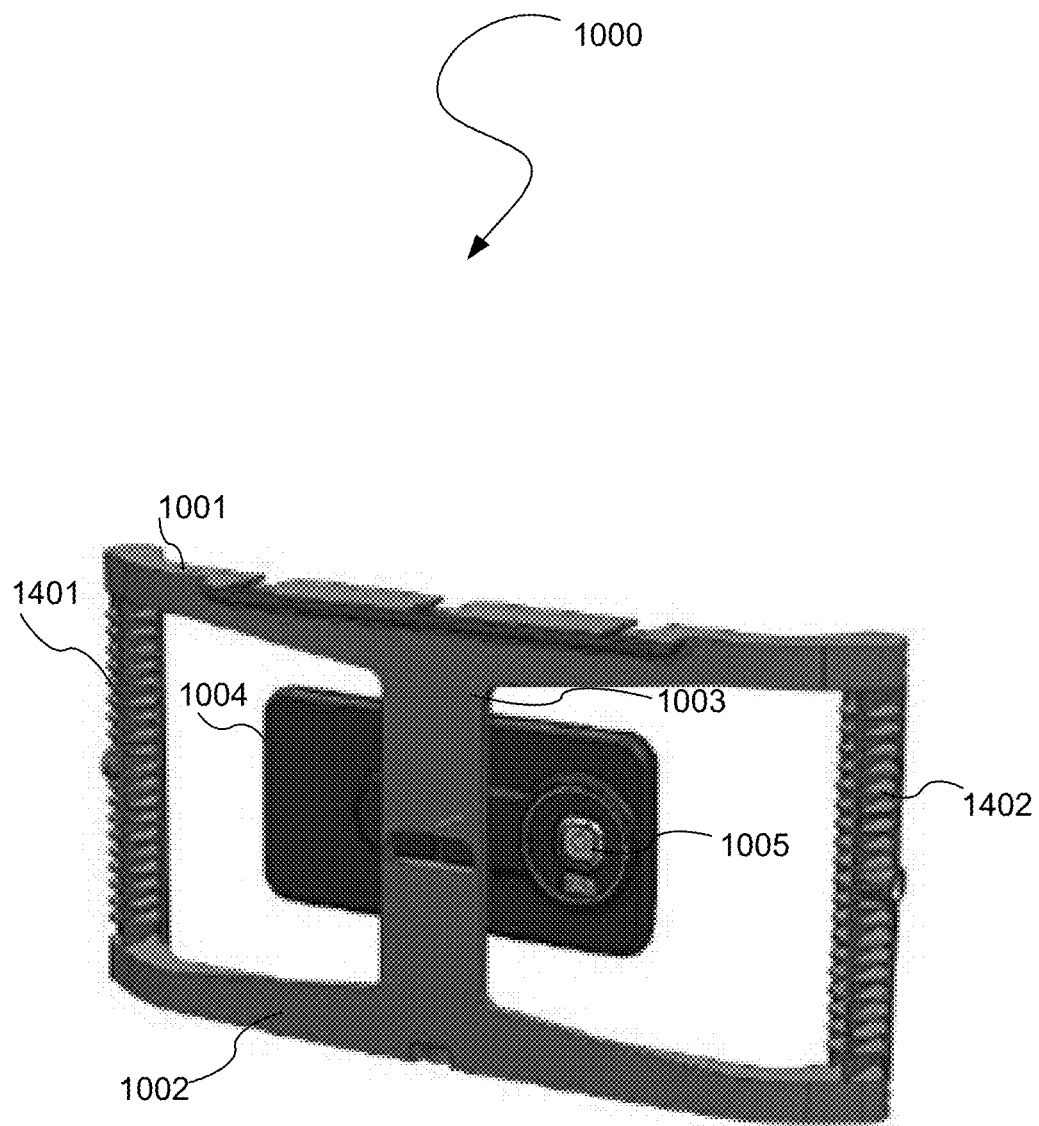
FIG. 14B illustrates a rear perspective view of the handle configuration illustrated in FIG. 14A.

In yet another alternative implementation, handles may be either attached to or integrated into the apparatus 1000 illustrated in FIGS. 10A and 10B. FIGS. 14A and 14B illustrate various views of a handle configuration that may be utilized with the apparatus 1000. FIG. 14A illustrates a front perspective view of a handle configuration in which a right handle 1401 and a left handle 1402 are integrated into the apparatus 1000. The handles 1401 and 1402 may extend outward in the same perimeter of the apparatus 1000. Alternatively, the handles 1401 and 1402 may be directed toward a user gripping the handles 1401 and 1402. For example, the handles 1401 and 1402 may be curved toward the user. As yet another alternative, the handles 1401 and 1402 may be directed away from a user gripping the handles 1401 and 1402. For example, the handles 1401 and 1402 may be curved away from the user. FIG. 14B illustrates a rear perspective view of the handle configuration illustrated in FIG. 14A.

Various quantities and types of handles may be utilized with the apparatus 1000. For example, less than two or more than two handles may be utilized. As another example, ribbed handles may be utilized.

Figure 15A:
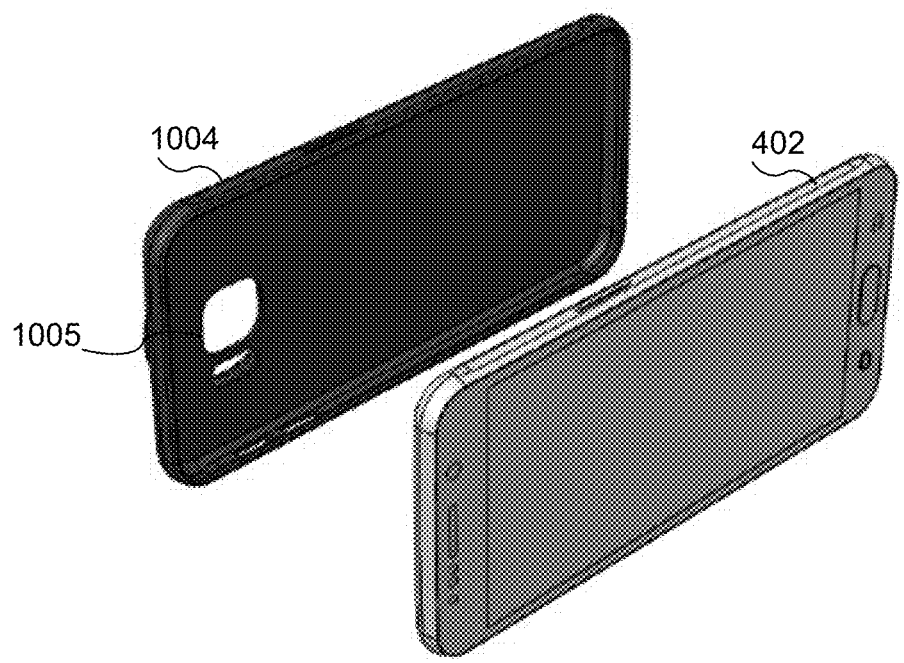
FIG. 15A illustrates a front perspective view of the image capture device and a front perspective view of the receptacle.
Figure 15B:
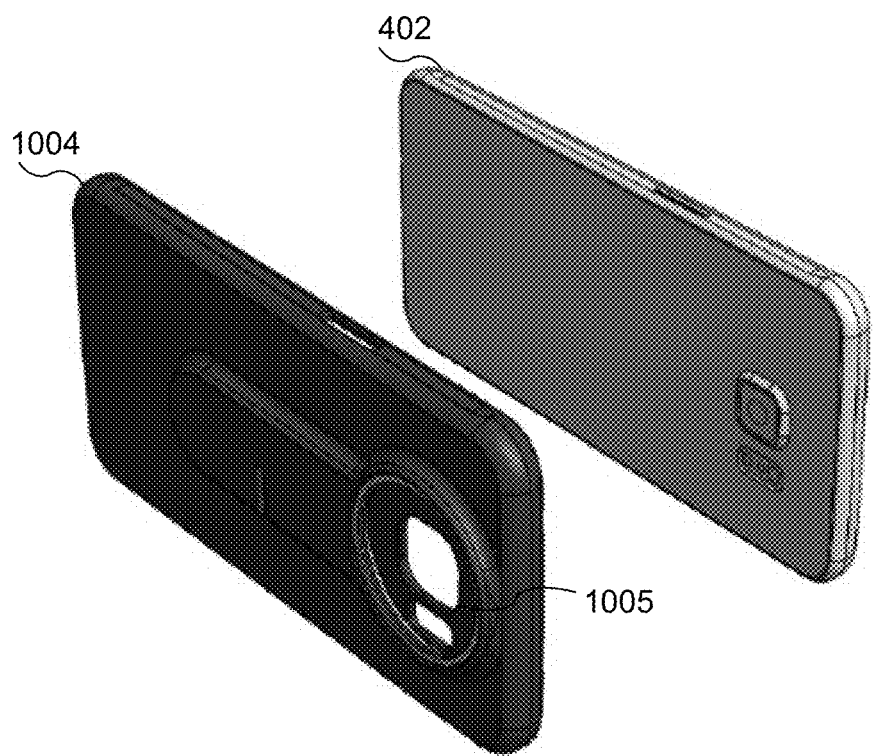
FIG. 15B illustrates a rear perspective view of the image capture device and a front perspective view of the receptacle.

Further, FIGS. 15A and 15B illustrate various views of the image capture device 402 and the receptacle 1004. FIG. 15A illustrates a front perspective view of the image capture device 402 and a front perspective view of the receptacle 1004. Further, FIG. 15B illustrates a rear perspective view of the image capture device 402 and a front perspective view of the receptacle 1004.

Figure 16A:
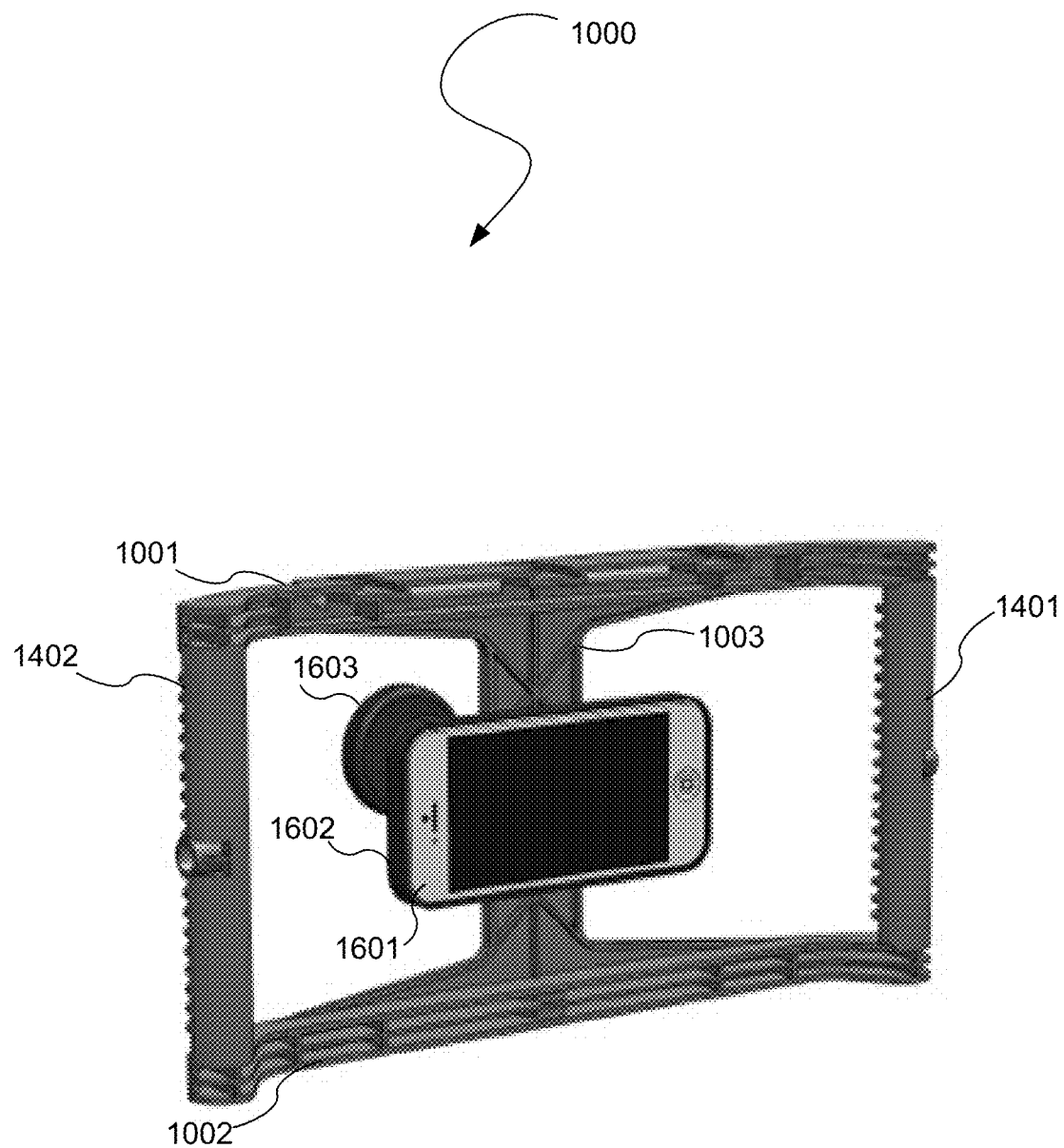
FIG. 16A illustrates an example of an image capture computing device that is a smartphone having different dimensions than the image computing device illustrated in FIGS. 14A and 14B.
Figure 16B:
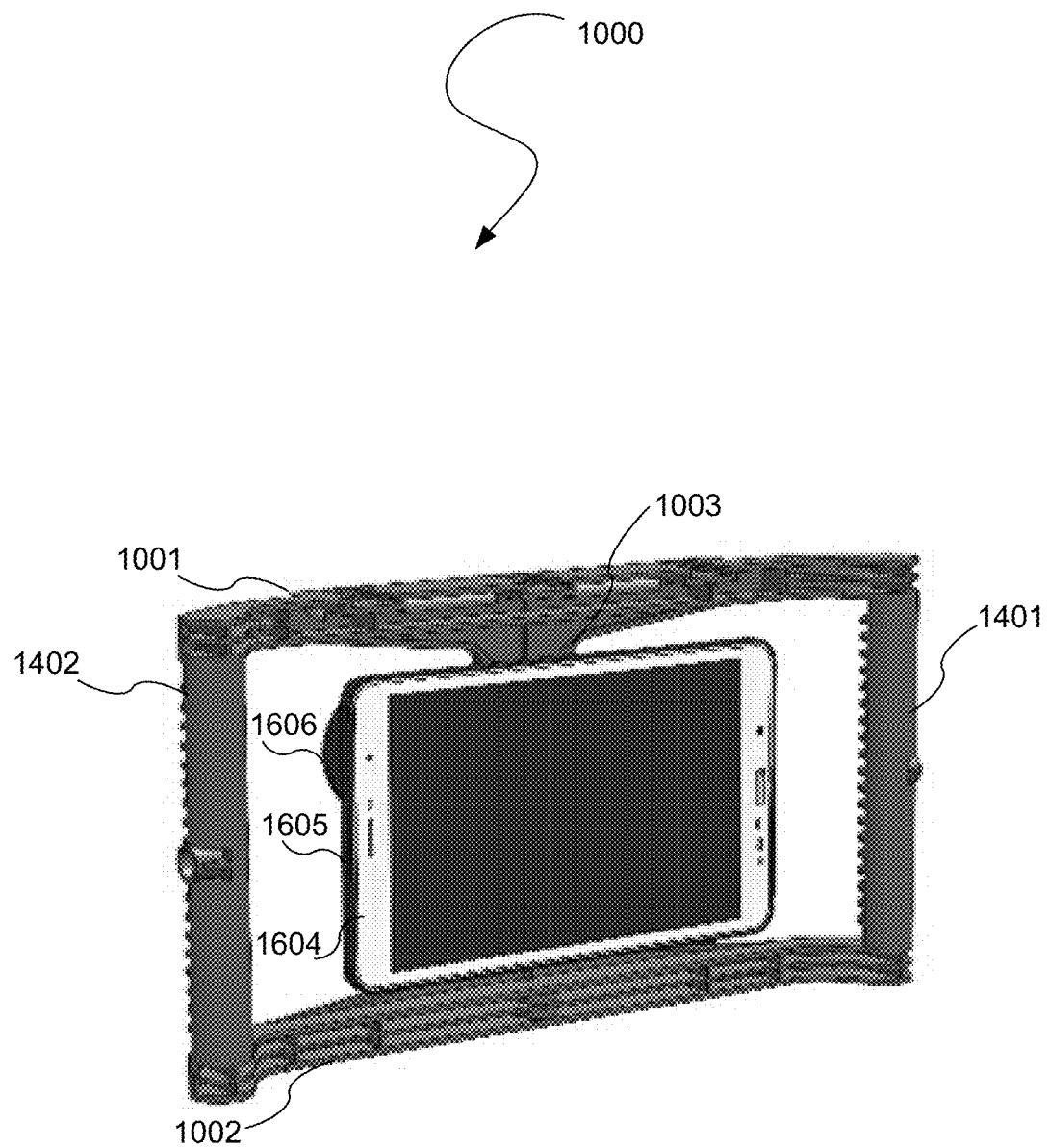
FIG. 16B illustrates an example of an image capture computing device that is a tablet device having different dimensions than the image computing device illustrated in FIGS. 14A and 14B.

In addition, FIGS. 16A and 16B illustrate different sized image capture computing devices 1601 and 1604 that may be utilized with the apparatus 1000 illustrated in FIGS. 14A and 14B or any of the other described configurations instead of the mobile computing device 402. FIG. 16A illustrates an example of an image capture computing device 1601 that is a smartphone having different dimensions than the image computing device 402 illustrated in FIGS. 14A and 14B. As a result, a receptacle 1602 also has different dimensions than the receptacle 1004 illustrated in FIGS. 14A and 14B to conform to the shape of the different sized image capture computing device 1601. Further, a lens accessory 1603 may be attached to or integrated into the receptacle 1602 for the image capture device 1601 to utilize for image capture.

FIG. 16B illustrates an example of an image capture computing device 1604 that is a tablet device having different dimensions than the image computing device 402 illustrated in FIGS. 14A and 14B. As a result, a receptacle 1605 also has different dimensions than the receptacle 1004 illustrated in FIGS. 14A and 14B to conform to the shape of the different sized image capture computing device 1604. Further, a lens accessory 1606 may be attached to or integrated into the receptacle 1605 for the image capture device 1601 to utilize for image capture.

In yet another implementation, an apparatus has a variety of adjustable mechanisms to accommodate mobile computing devices of different dimensions. In other words, a single apparatus may be used to securely receive and fit different sized mobile computing devices—one at a time. As a result, a user does not have to use different receptacles for different sized mobile computing devices 402 to perform image capture. A user can remove a first mobile computing device 402, readjust the adjustable mechanisms to fit a second mobile computing device 402, and insert the second mobile computing device 402 into the receptacle.

Figure 17:
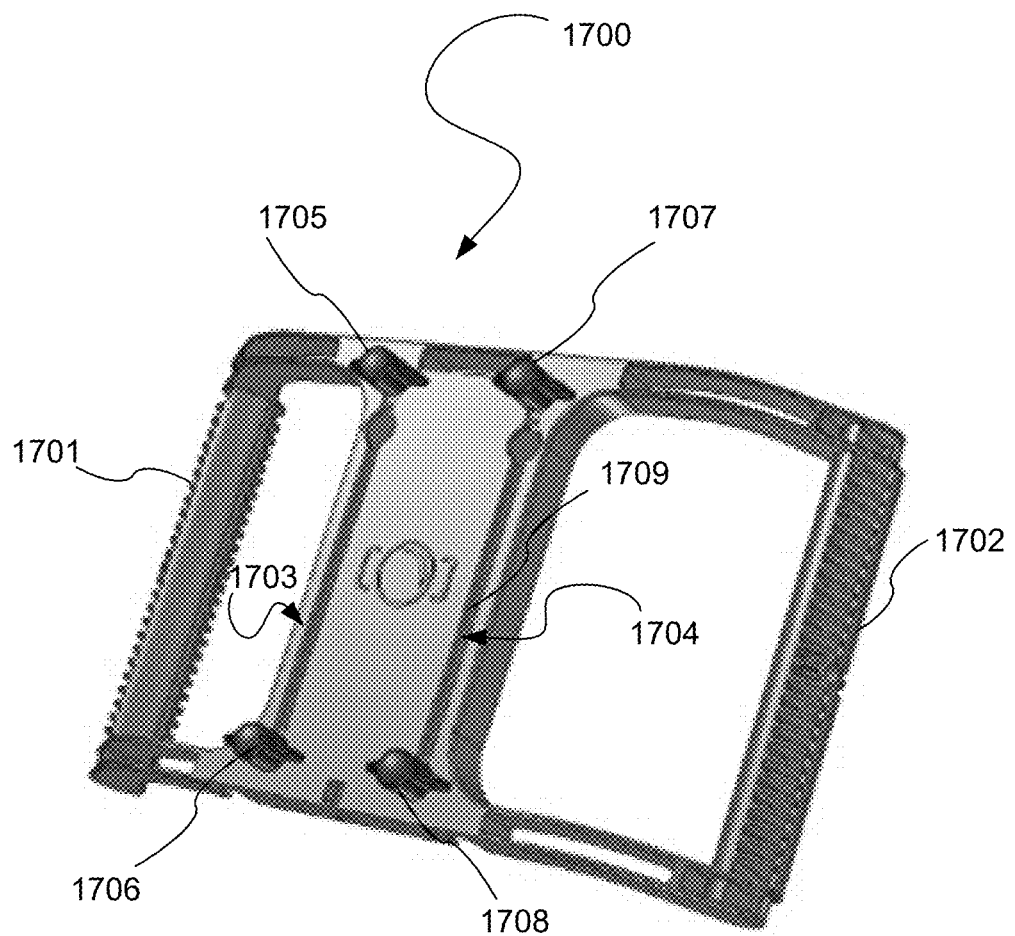
FIG. 17 illustrates a rear perspective view of an apparatus that receives different sized mobile devices.

FIG. 17 illustrates a rear perspective view of an apparatus 1700 that receives different sized mobile devices 402. The apparatus 1700 has a right handle 1701 and a left handle 1702. Further, the apparatus 1700 has one or more vertical slots (e.g., first vertical slot 1703 and second vertical slot 1704). The slots 1703 and 1704 are illustrated as being vertical as examples; other configurations such as horizontal slots, diagonal slots, etc., may be used instead. In addition, a pair of adjustable mechanisms (e.g., knobs 1705 and 1706 for the first vertical slot 1703, knobs 1707 and 1708 for the second vertical slot 1704, etc.) may be used to maneuver (e.g., slide) the adjustable mechanisms to a position that fits the dimensions of the mobile computing device 402 positioned on the opposite side (front) of the apparatus 1700.

The knobs 1705, 1706, 1707, and 1708 may be twisted to secure adhering members (e.g., gripping members, clipping members, etc.) positioned on the opposite side of the receptacle; similarly, the knobs 1705, 1706, 1707, and 1708 may be loosened to allow the adhering members to loosen the grip on the mobile computing device 402 for a user to be able to remove the mobile computing device 402 from the receptacle 1700.

In one embodiment, the knobs 1705, 1706, 1707, and 1708 are attached, respectively, to members within the slots 1703 and 1704 that, when configured, are wider than the slots 1703 and 1704 so that the knobs when attached to the members stay positioned within the slots 1703 and 1704. For example, one end of the knobs 1705, 1706, 1707, and 1708 may include a connector (e.g., screw, clip, etc.) that connects the knobs 1705, 1706, 1707, and 1708 to the adhering members within the slots 1703 and 1704. For example, the connectors may allow for alignment of the adhering members and the knobs 1705, 1706, 1707, and 1708 between the front portion and the rear portion of the apparatus 1700.

In various other embodiments, other types of adjustable mechanisms (e.g., buttons, latches, etc.) may be used to adjust, secure, and loosen receiving members positioned on the opposite side of the receptacle. Further, in various other embodiments, the adjustable mechanisms do not have to slide within the slots 1703 and 1704; for instance, the adjustable mechanisms may be remove and inserted at designated receiving ports associated with different predetermined distances separating the receiving members positioned on the opposite side of the receptacle.

In addition, the apparatus 1700 has a center-positioned member 1709 that is situated between the right handle 1701 and the second handle 1702. In one embodiment, the center-positioned member 1709 is constructed from a solid material such that a lens of an image capture device integrated within, or in operable communication with, the mobile computing device 402 is positioned to a side of the center-positioned member 1709.

Figure 18:
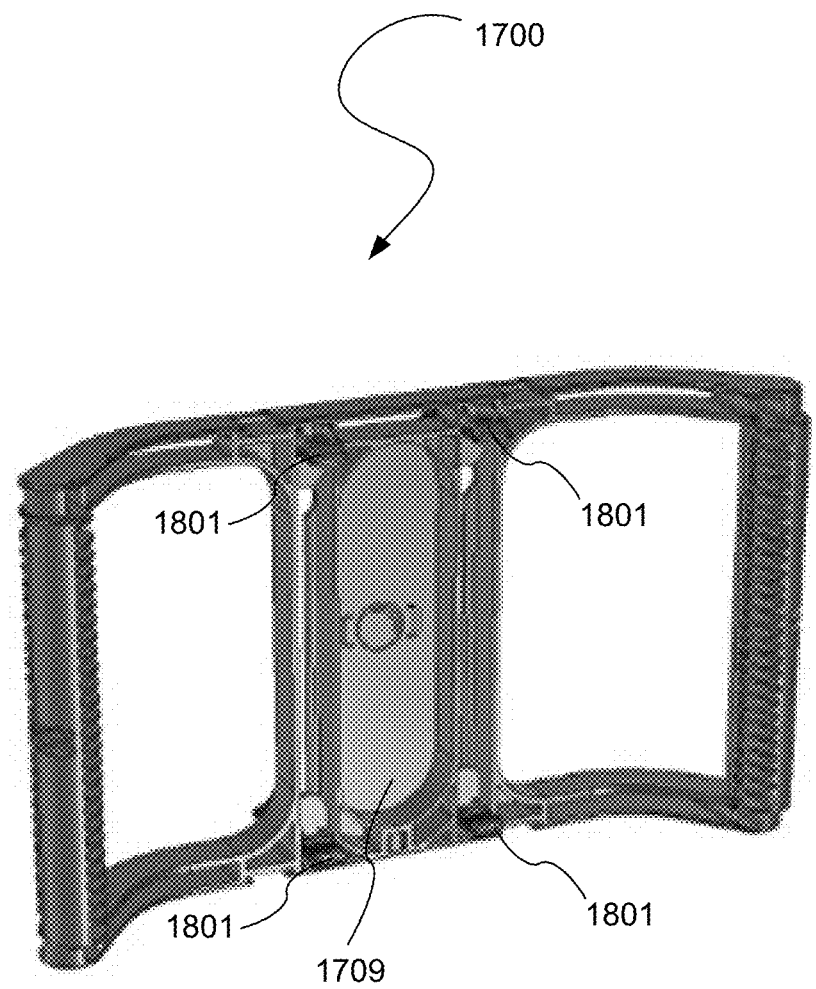
FIG. 18 illustrates a front view of the apparatus illustrated in FIG. 17.

FIG. 18 illustrates a front view of the apparatus 1700 illustrated in FIG. 17. A plurality of adjustable members 1801 (e.g., adhering members) may act as gripping members to grip the mobile computing device 402. The adjustable members 1801 may have gripping portions that may be moved (e.g., slid via the vertical slots 1701-1704) into positions to grip portions of the exterior perimeter of the mobile computing device 402, or a receptacle that receives the mobile computing device 402, so that the mobile computing device 402, or the receptacle that receives the mobile computing device 402, is adhered to the apparatus 1700. Even though two top adjustable members 1801 and two bottom adjustable members 1801 are illustrated in FIG. 18, a variety of quantities of adjustable members 1801 may be utilized in different configurations (e.g., side adjustable members 1801, only one top adjustable member 1801 and one bottom adjustable member 1801, only one adjustable member 1801, etc.).

Further, the adjustable members 1801 may adhere the mobile computing device 402 to the apparatus 1700 through a variety of different configurations other than via gripping members. For instance, the adjustable members 1802 may adhere the mobile computing device 402 to the apparatus 1700 via a clipping apparatus, hooking apparatus, groove apparatus, etc.

Figure 19A:
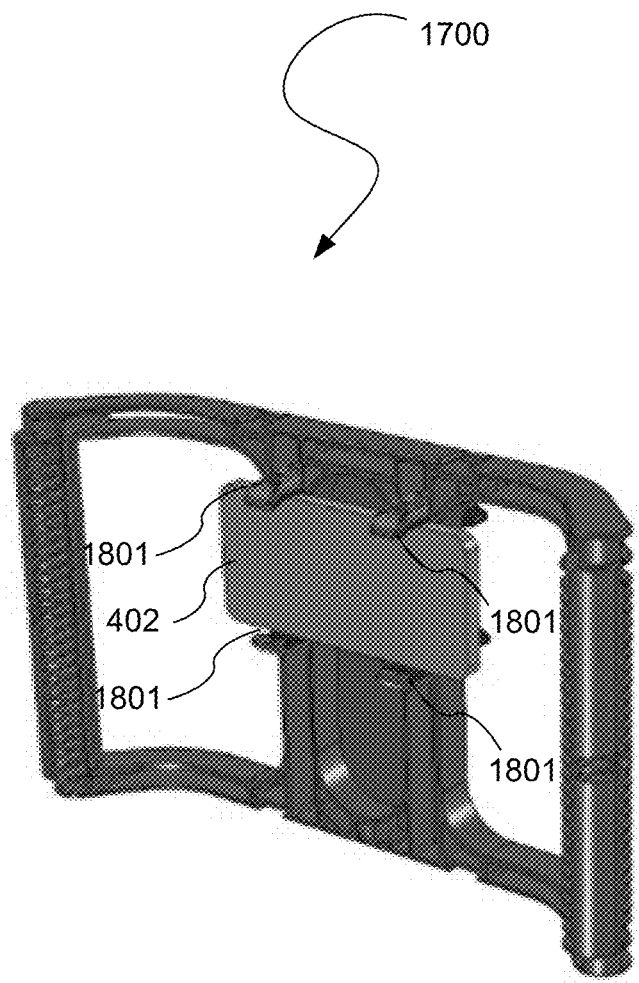
FIG. 19A illustrates a front perspective view of the apparatus illustrated in FIG. 18 with the mobile computing device being gripped by the adjustable members.
Figure 19B:
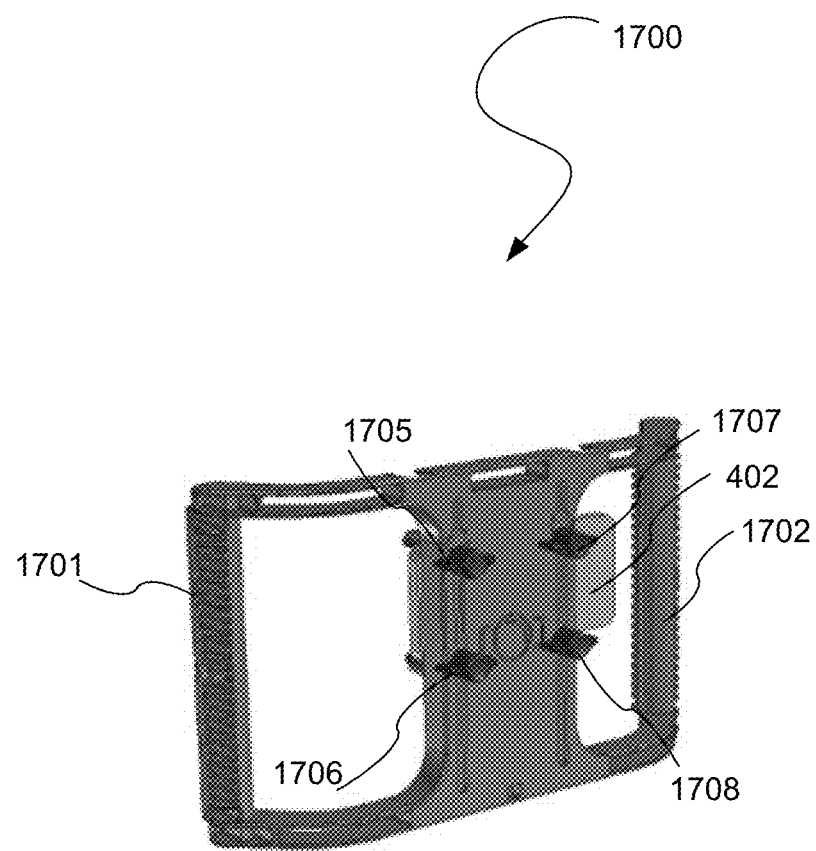
FIG. 19B illustrates a rear perspective view of the apparatus illustrated in FIG. 19A.

FIG. 19A illustrates a front perspective view of the apparatus 1700 illustrated in FIG. 18 with the mobile computing device 402 being gripped by the adjustable members 1801. The bottom adjustable members 1801 were slid upward to adjust to the side dimensions of the mobile computing device 402. Alternatively, the top adjustable members 1801, or both the top adjustable members 1801 and the bottom adjustable members 1801, may have been slid and secured (e.g., via knobs 1705-1708) to grip the mobile computing device 402. Further, FIG. 19B illustrates a rear perspective view of the apparatus illustrated in FIG. 19A. The knobs 1705-1708 have been adjusted and secured so that the mobile computing device 402 is in a position toward the top of the apparatus 1700.

Figure 19C:
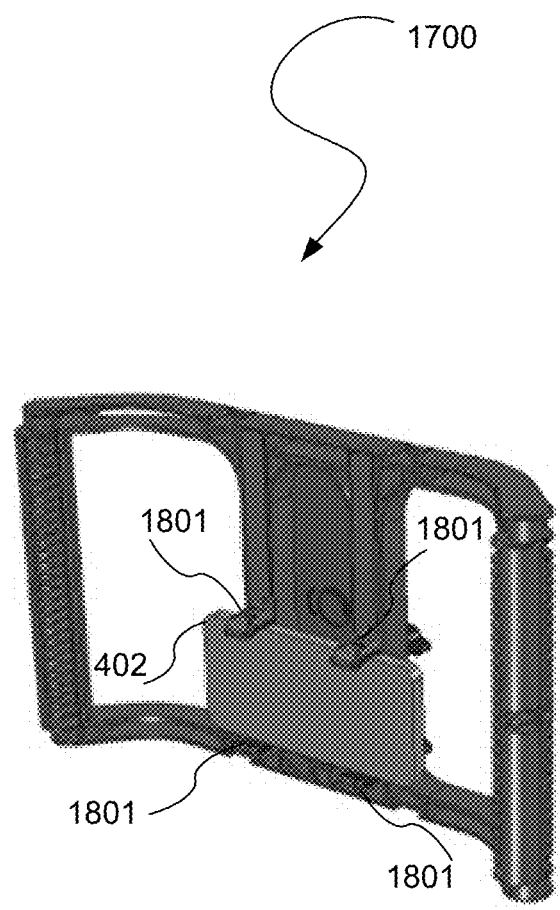
FIG. 19C illustrates an adjustment to the position of the mobile computing device with respect to the apparatus.
Figure 19D:
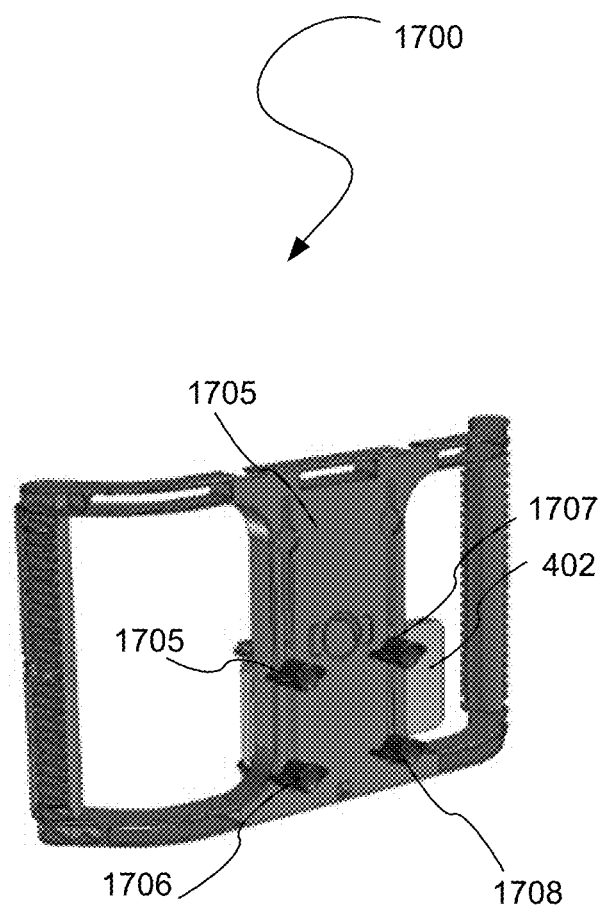
FIG. 19D illustrates a rear perspective view of the apparatus illustrated in FIG. 19C.

After being gripped by the adjustable members 1801 as illustrated in FIG. 19A, the position of the mobile computing device 402 with respect to the apparatus 1700 may be adjusted. FIG. 19C illustrates an adjustment to the position of the mobile computing device 402 with respect to the apparatus 1700. The mobile computing device 402 may be slid (e.g., upward or downward) via the slots 1703 and 1704 after being adhered to the apparatus 1700. As a result, a user is able to secure the mobile computing device 402 to the apparatus 1700 and then determine the most optimal position of the mobile computing device 402 with respect to the apparatus 1700 for that particular user through various adjustments to the position of the mobile computing device 402. Further, FIG. 19D illustrates a rear perspective view of the apparatus illustrated in FIG. 19C. The knobs 1705-1708 have been adjusted and secured so that the mobile computing device 402 is in a position toward the bottom of the apparatus 1700.

Figure 20:
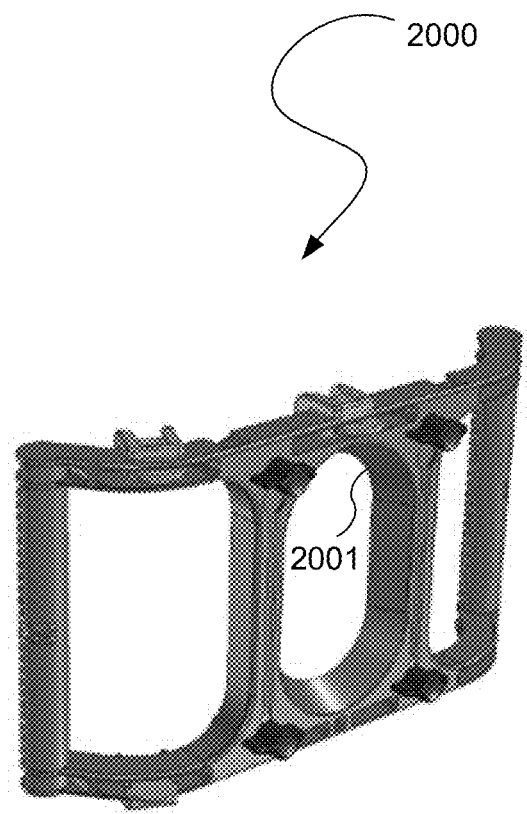
FIG. 20 illustrates a rear perspective view of another apparatus that receives different sized mobile devices.

As an alternative embodiment, the center member of the apparatus 1700 illustrated in FIG. 17 may have an area through which an image capture device of the mobile computing device 402 may capture images. FIG. 20 illustrates a rear perspective view of another apparatus 2000 that receives different sized mobile devices. The apparatus 2000 has a cavity with a border 2001. The mobile computing device 402 may be positioned in a similar manner to the configurations described with respect to FIGS. 17-19D but with the cavity through which the image capture computing device may be centered; as a result, the mobile computing device may have an image capture computing device 402 in portions other than the side of the mobile computing device 402.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

We claim:

1. An apparatus comprising:
   a first member;
   a second member;
   a third member that couples the first member and the second member such that the second member is parallel to the first member, the third member is perpendicular to the first member and the second member, and the third member is in between the first member and the second member;
   two slots integrated within a rear portion of the third member; and
   two adjustable members, arranged in each one of said two slots, positioned on a front portion of the third member which adhere a mobile computing device to the front portion of the third member, the two adjustable members being adjusted within each respective slot.

2. The apparatus of claim 1, wherein the two adjustable members, arranged in each one of said two slots, each further comprise a knob positioned on the rear portion of the third member that secures the respective adjustable member to the mobile computing device on the front portion of the third member.

3. The apparatus of claim 1, wherein the two adjustable members, arranged in each one of said two slots each comprises a gripping member positioned on the front portion of the third member.

4. The apparatus of claim 1, wherein the two adjustable members, arranged in each one of said two slots, each comprises a clip member positioned on the front portion of the third member.

5. The apparatus of claim 1, wherein the two adjustable members, arranged in each one of said two slots, each comprises a hook member positioned on the front portion of the third member.

6. The apparatus of claim 1, wherein the two adjustable members, arranged in each one of said two slots, adjust to the horizontal dimensions of the mobile computing device so that the mobile computing device is adhered to the third member.

7. The apparatus of claim 1, wherein the two adjustable members, arranged in each one of said two slots, adjust to the vertical dimensions of the mobile computing device so that the mobile computing device is adhered to the third member.

8. The apparatus of claim wherein the third member is configured so that a lens of the mobile computing device is positioned to a side of the third member.

9. The apparatus of claim 1, further comprising a handle positioned perpendicular to, and in between, the first member and the second member.

10. An apparatus comprising:
    a first member;
    a second member;
    a third member that couples the first member and the second member such that the second member is parallel to the first member, the third member is perpendicular to the first member and the second member, and the third member is in between the first member and the second member;
    two slots integrated within a rear portion of the third member; and
    two adjustable members, arranged in each one of said two slots, positioned on a front portion of the third member which adhere a receptacle for a mobile computing device to the front portion of the third member, the two adjustable members being adjusted within each respective slot.

11. The apparatus of claim 10, wherein the two adjustable members, arranged in each one of said two slots, each further comprise a knob positioned on the rear portion of the third member that secures the respective adjustable member to the receptacle of the mobile computing device on the front portion of the third member.

12. The apparatus of claim 10, wherein the two adjustable members, arranged in each one of said two slots, each comprises a gripping member positioned on the front portion of the third member.

13. The apparatus of claim 10, wherein the two adjustable members, arranged in each one of said two slots each comprises a clip member positioned on the front portion of the third member.

14. The apparatus of claim 10, wherein the two adjustable members, arranged in each one of said two slots, each comprises a hook member positioned on the front portion of the third member.

15. The apparatus of claim 10, wherein the two adjustable members, arranged in each one of said two slots, adjust to the horizontal dimensions of the receptacle of the mobile computing device so that the mobile computing device is adhered to the third member.

16. The apparatus of claim 10, wherein the two adjustable members, arranged in each one of said two slots, adjust to the vertical dimensions of the receptacle of the mobile computing device so that the mobile computing device is adhered to the third member.

17. The apparatus of claim 10, wherein the third member is configured so that a lens of the mobile computing device is positioned to a side of the third member.

18. The apparatus of claim 10, further comprising a handle positioned perpendicular to, and in between, the first member and the second member.

* * * * *